United States Patent
Kleinikkink et al.

(10) Patent No.: US 9,505,560 B2
(45) Date of Patent: Nov. 29, 2016

(54) SYSTEM AND METHOD FOR CONTROLLING A MOVING ELEMENT IN A LINEAR MOTOR CONVEYOR

(71) Applicant: ATS AUTOMATION TOOLING SYSTEMS INC., Cambridge (CA)

(72) Inventors: Albert Kleinikkink, Cambridge (CA); John Ditner, Cambridge (CA); Graham Knap, Cambridge (CA); Allan Dubeau, Waterloo (CA)

(73) Assignee: ATS AUTOMATION TOOLING SYSTEMS INC., Cambridge, Ontario (CA)

( * ) Notice: Subject to any disclaimer, the term of this patent is extended or adjusted under 35 U.S.C. 154(b) by 0 days.

(21) Appl. No.: 14/727,188

(22) Filed: Jun. 1, 2015

(65) Prior Publication Data

US 2015/0344233 A1     Dec. 3, 2015

Related U.S. Application Data

(60) Provisional application No. 62/006,553, filed on Jun. 2, 2014.

(51) Int. Cl.
*B65G 43/10* (2006.01)
*G05B 19/414* (2006.01)
(Continued)

(52) U.S. Cl.
CPC ............... *B65G 43/10* (2013.01); *G05B 19/00* (2013.01); *G05B 19/414* (2013.01); *B65G 54/02* (2013.01); *B65G 2811/0673* (2013.01)

(58) Field of Classification Search
CPC .............................. B65G 43/10; G05B 19/414
See application file for complete search history.

(56) References Cited

U.S. PATENT DOCUMENTS 6,039,316 A     3/2000  Jackson et al.
6,240,335 B1 *  5/2001  Wehrung ............ G05B 19/4182
                                                    198/571

(Continued)

FOREIGN PATENT DOCUMENTS

CA     2288223          11/1998
CA     2354624 A1 *     12/1999 ......... G05B 19/4182
(Continued)

OTHER PUBLICATIONS

Canadian Intellectual Property Office As International Searching Authority, International Search Report and Written Opinion on PCT/CA2015/050501, dated Jul. 30, 2015.

*Primary Examiner* — Thomas Randazzo
(74) *Attorney, Agent, or Firm* — Gowling WLG (Canada) LLP; Neil Henderson

(57) ABSTRACT

A system for controlling moving elements including: a zone controller; a first network and a second network; at least one first motor gateway associated with a portion of the conveyor and assigned to the first network; and at least one second motor gateway associated with a different portion of the conveyor and assigned to the second network; wherein the zone controller and the motor gateways are configured to: communicate data to control the moving elements via the first and second networks in a structured manner to compensate for network or processing timing. A method for controlling moving elements including: communicating data related to control of the moving element conveyor, in a structured manner to compensate for network or processing timing, between a zone controller and first and second motor gateways.

18 Claims, 15 Drawing Sheets

(51) Int. Cl.
*G05B 19/00* (2006.01)
*B65G 54/02* (2006.01)

(56) References Cited

U.S. PATENT DOCUMENTS

| | | | | |
|---|---|---|---|---|
| 6,591,961 B2 * | 7/2003 | Fukushima | ............ | B61B 13/08 198/346.1 |
| 6,853,876 B2 * | 2/2005 | Wehrung | ........... | G05B 19/4182 198/571 |
| 6,996,454 B1 * | 2/2006 | Edstrom | ................ | B65G 43/10 198/358 |
| 7,280,889 B2 * | 10/2007 | Knepple | ................ | B65G 37/02 198/460.1 |
| 7,360,638 B2 * | 4/2008 | Ko | ....................... | G05B 19/414 198/575 |
| 7,705,742 B1 * | 4/2010 | Delaney, III | ......... | H01R 4/2404 198/460.1 |
| 7,904,182 B2 * | 3/2011 | Hosek | ................ | G05B 19/4148 118/687 |
| 8,397,896 B2 * | 3/2013 | Kleinikkink | ......... | B23Q 7/1447 198/345.3 |
| 8,757,363 B2 * | 6/2014 | Combs | ................... | B65G 43/10 198/349 |

FOREIGN PATENT DOCUMENTS

| | | |
|---|---|---|
| CA | 2354624 | 6/2000 |
| WO | 2012170636 | 12/2012 |

* cited by examiner

SYSTEM AND METHOD FOR CONTROLLING A MOVING ELEMENT IN A LINEAR MOTOR CONVEYOR

RELATED APPLICATIONS

This application claims priority to application number 62/006,553 filed Jun. 2, 2014, which is hereby incorporated herein by reference.

FIELD

The present disclosure relates generally to conveyor systems. More particularly, the present disclosure relates to a system and method for controlling a moving element in a linear motor conveyor.

BACKGROUND

In conventional linear motor conveyor systems, as the linear motor system is expanded with more linear motors and more moving elements and faster speeds, the complexity of the system increases substantially, particularly in high speed linear motors such as those used in manufacturing environments. For example, the amount of processing power needed to control the system typically increases. Further, in many of these systems, the control architecture is such that the processing burden on certain devices increases as the system size increases. As well, as scale up, systems that rely on networks that require increasing bandwidth can become constrained for lack of available bandwidth. Thus, this increasing size and speed of linear motor systems can become a system constraint.

As such, there is a need for an improved system and method for manufacturing and controlling linear motor conveyors.

SUMMARY

In one aspect, there is provided a system for controlling moving elements on a linear motor conveyor, the system including: a zone controller; a first network and a second network operatively connected to the zone controller; at least one first motor gateway associated with a portion of the conveyor and assigned to the first network; and at least one second motor gateway associated with a different portion of the conveyor and assigned to the second network; wherein the zone controller, the at least one first motor gateway, and the at least one second motor gateway are configured to: communicate data related to control of the moving elements via the first network and the second network in a structured manner to compensate for network or processing timing.

In a particular case, each of the first network and the second network may include: a command channel configured to communicate command data; and a response channel configured to communicate response data.

In another particular case, the linear motor conveyor may include: a plurality of zone controllers, a plurality of first and second networks associated with the plurality of zone controllers and a plurality of at least one first and second motor gateways associated with the plurality of first and second networks.

In still another particular case, the structured manner may include communicating the data in a timed sequence wherein each motor gateway communicates based on predetermined timing.

In yet another particular case, the structured manner may include communicating the data in a latching sequence wherein each motor gateway receives a command and creates a snapshot of the data relating to moving elements at a predetermined time and communicates the snapshot to the zone controller such that the zone controller performs calculations on substantially simultaneous data.

In still yet another particular case, the structured manner may include communicating the data in an event driven sequence based on an event indicator provided in communications.

In a particular case, each motor gateway is configured to transmit the event indicator unless the motor gateway is the last motor gateway to complete the event.

In another particular case, when a first adjacent motor gateway of the at least one motor gateway associated with a first zone controller is adjacent a second adjacent motor gateway of the at least one motor gateway associated with a second zone controller, each of the first and second adjacent motor gateways may be configured to communicate data related to the moving elements to both the first zone controller and the second zone controller.

In still another particular case, control of the first adjacent motor gateway and second adjacent motor gateway may be handled by either the first zone controller or the second zone controller based on a hysteresis band associated with a position and direction of movement of a moving element associated with the motor gateways.

In yet another particular case, the zone controller may be further configured to: detect a new motor added to the linear motor conveyor; and configure the new motor and motor gateway associated with the new motor.

In another aspect, there is provided a method for controlling moving elements on a linear motor conveyor, the method including: communicating data related to control of the moving element conveyor between a zone controller and at least one first motor gateway associated with a portion of the conveyor, via a first network, wherein the data is communicated in a structured manner to compensate for network or processing timing; communicate data related to control of the moving elements between the zone controller and at least one second motor gateway associated with a different portion of the conveyor, via a second network, wherein the data is communicated in a structured manner to compensate for network or processing timing.

In a particular case, the method may further include: communicating command data via a command channel of each of the first network and the second network; and communicating response data via a response channel of each of the first network and the second network.

In another particular case, the linear motor conveyor may include: a plurality of zone controllers, a plurality of first and second networks associated with the plurality of zone controllers and a plurality of at least one first and second motor gateways associated with the plurality of first and second networks.

In still another particular case, the structured manner may include communicating the data in a timed sequence wherein each motor gateway communicates based on predetermined timing.

In yet another particular case, the structured manner may include communicating the data in a latching sequence wherein each motor gateway receives a command and creates a snapshot of the data relating to the moving elements at a predetermined time and communicates the snapshot to the zone controller such that the zone controller performs calculations on substantially simultaneous data.

In still yet another particular case, the structured manner may include communicating the data in an event driven sequence based on an event indicator provided in communications.

In a particular case, each motor gateway may be configured to transmit the event indicator unless the motor gateway is the last motor gateway to complete the event.

In another particular case, when a first adjacent motor gateway of the at least one motor gateway associated with a first zone controller is adjacent a second adjacent motor gateway of the at least one motor gateway associated with a second zone controller, each of the first and second adjacent motor gateways may be configured to communicate data related to the moving elements to both the first zone controller and the second zone controller.

In yet another particular case, control of the first adjacent motor gateway and second adjacent motor gateway may be handled by either the first zone controller or the second zone controller based on a hysteresis band associated with a position and direction of movement of a moving element associated with the motor gateways.

In still yet another particular case, the method may further include: detecting, via the zone controller, a new motor added to the linear motor conveyor; and configuring the new motor and motor gateway associated with the new motor, via the zone controller.

BRIEF DESCRIPTION OF FIGURES

Embodiments of the present disclosure will now be described, by way of example only, with reference to the attached Figures.

DETAILED DESCRIPTION

Generally, the present disclosure provides a system and method for controlling a moving element in a linear motor conveyor that is intended to overcome at least some of the limitations of conventional systems.

In particular, some embodiments provide a linear motor conveyor system in which zone controllers control the conveyor system by using two networks, a first network and a second network, one on each "side" of the zone controller and operatively connected to the zone controller. This embodiment is intended to reduce issues caused due to propagation delays that may accumulate in conventional systems.

In some cases, there may be a plurality of zone controllers controlling multiple zones. With a plurality of zone controllers, there may be added complexity for the system to be able to provide seamless control of moving elements as they cross the boundary from one zone to the next. Moving element position feedback and coil current control typically should be precisely coordinated at high speed between the controllers of adjacent networks or zones. For example, at the transitions between zones, the data may not be synchronized between the two motors that border the zone boundaries. Another discontinuity can occur at the transition between the first and last motor on a single zone that loops around and rejoins. A discontinuity at a network boundary can impact the control of a moving element crossing a zone boundary due to the typically high speed of linear motors. If some moving element position information is newer while other moving element position information is older, the moving element can cross over this discontinuity, which may cause a "jump" in the control of the moving element. An issue can also occur with the control of current in the coils that cross a network boundary if there is a discontinuity in the timing of when coil currents are adjusted, jumps or fluctuations can occur with the moving element. As such, some embodiments described herein provide a linear motor conveyor system configured to handle a discontinuity that can occur at network or zone boundaries.

Still further, some embodiments provide a linear motor conveyor system configured to handle issues with the complexity of shared control between multiple levels. If the processing of move instructions, moving element positions, and the like, is shared between multiple devices, the system may become overly complex to implement, maintain and scale.

Figure 1:
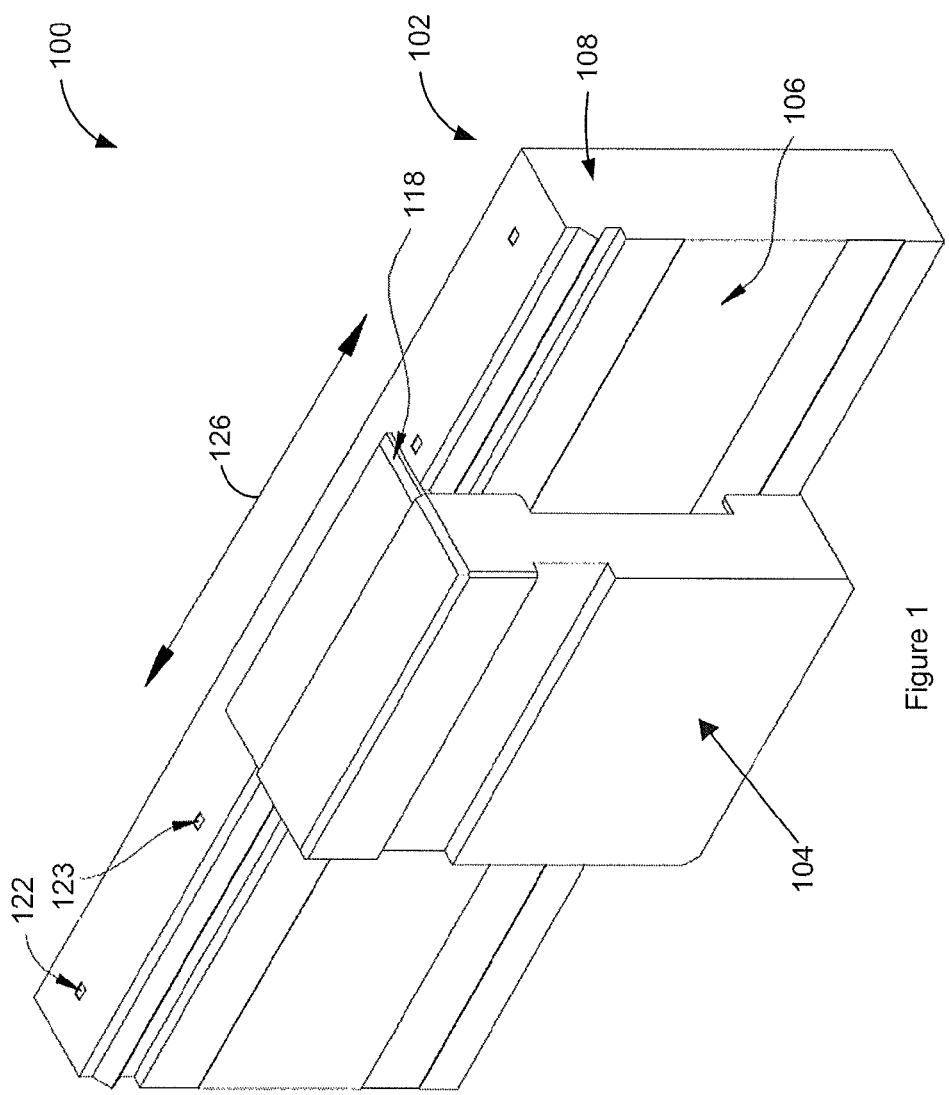
FIG. 1 illustrates a perspective view of a track section of a linear motor conveyor system.

FIG. 1 illustrates a conveyor system 100 having a track section 102. The track section 102 features one or more moving elements 104 (only one is illustrated) which are configured to ride or travel along a track 106 of the track section 102. The moving element 104 may be any appropriate transport structure and may be configured to carry, support, or otherwise transport a support, such as, for example, a pallet, platform, carriage, staging, bed or the like. The track 106 includes a frame 108 configured to support the moving element 104. Some of the principles of operation of a similar track section are described in more detail in U.S. Pat. No. 8,397,896 to Kleinikkink et al., which is hereby incorporated herein by reference.

The conveyor system 100 can be composed of a plurality of track sections 102 which are mechanically self-contained and quickly and easily separable from one another so as to be modular in nature. In this embodiment, the track sections 102 are mounted on a support (not shown) so as to align and abut one another in order to form a longer track. In order to be modular, each track section 102 may house self-contained electronic circuitry for powering and/or operating the track section 102. The conveyor system 100 may include curvilinear track sections 102.

Figure 2A:
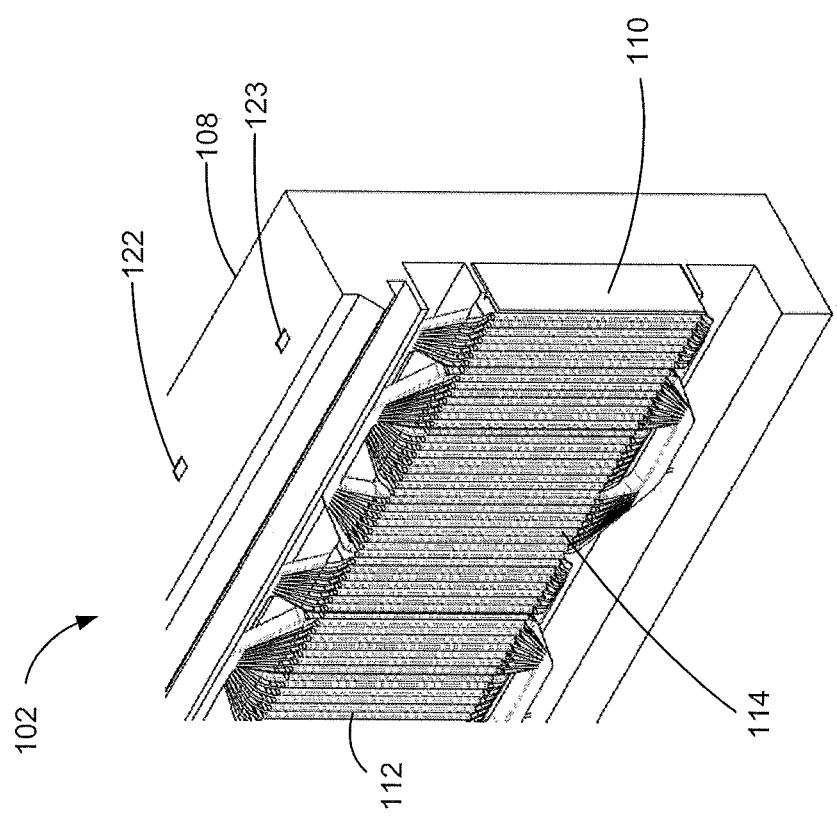
FIG. 2A illustrates a perspective view of the track section.
Figure 2B:
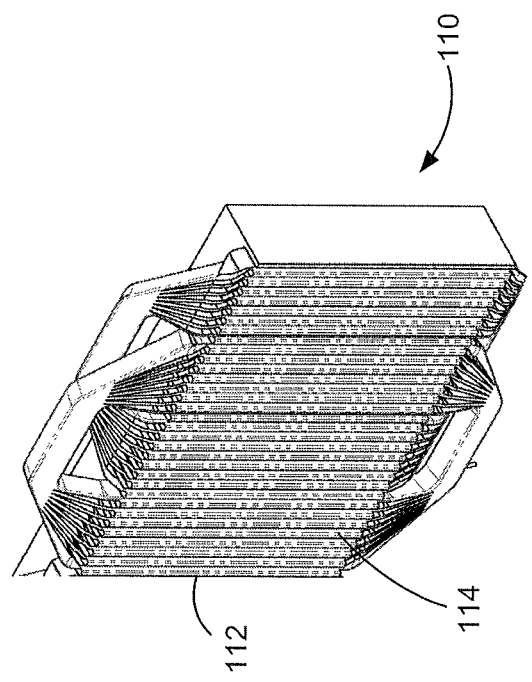
FIG. 2B illustrate an exploded view of coils of the track section.
Figure 2C:
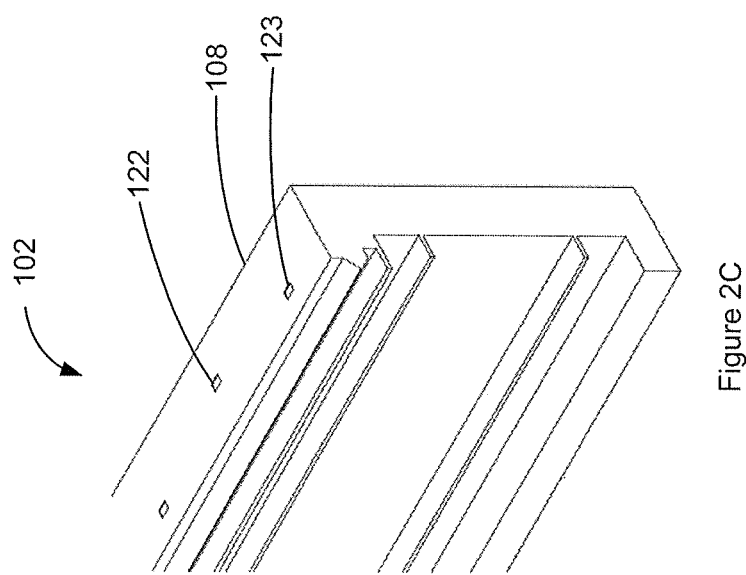
FIG. 2C illustrates an exploded view of the track section.

FIG. 2A illustrates a perspective view of the track section 102. FIGS. 2B and 2C illustrate an exploded view of the track section 102. The track section 102 includes the frame 108 that houses a linear drive mechanism 110. The linear drive mechanism 110 is formed as a stator armature 112 including a plurality of embedded coils 114. The embedded coils can be individually excited so that an electrically-induced magnetic flux produced by the stator armature 112 is located adjacent to a given moving element 104 to be controlled, in a direction normal thereto, without affecting adjacent moving elements 104. The motive force for translating each moving element 112 arises from the magneto-motive force (MMF) produced by each moving element 104 and the stator armature 112, i.e., by the tendency of the corresponding magnetic fluxes provided by the stator armature 112 and moving element 104 to align. A controller (described below) enables separate and independent moving MMFs to be produced along the length of the track section 102 for each moving element 104 so that each moving element 104 can be individually controlled with a trajectory profile that is generally independent of any other moving element 104. Structurally, the track section 102 may thus be broadly classified as a moving-magnet type linear brushless motor having multiple moving elements 104.

Referring again to FIG. 1, each moving element 104 includes an extension 118 provided with a machine readable medium 120 (indicated in FIG. 4), which may be, for example, a magnetic strip, an optically receptive, transmissive or reflective strip, capacitive strip, color-coded strip, other type of feedback system or the like. The extension 118 is configured such that the machine readable medium 120 interacts with sensors 122, 123 provided to the track 106. The sensors 122, 123 are configured to read the machine readable medium 120, whether magnetically, optically, or otherwise. The machine readable medium 120 and sensors 122, 123 form a position sensing system. The position sensing system may be arranged such that the position sensing system is protected from traffic on the track section 102 and dust and other debris. The position sensing system is employed in the moving element identification and position-detecting subsystem (described in further detail below).

The sensors 122, 123 are located on the track section 102 and the machine readable medium 120 is located on the moving element 104. In an alternative, the sensors 122, 123 may be located on the moving element 104 and the machine readable medium 120 may be located on the track section 102. The sensors 122, 123 may be configured to read an identifier of the moving element 104 from the machine readable medium 120. The same sensors 122, 123 are configured to read a position of the moving element 104 on the track section 102 from the machine readable medium 120.

Figure 3:
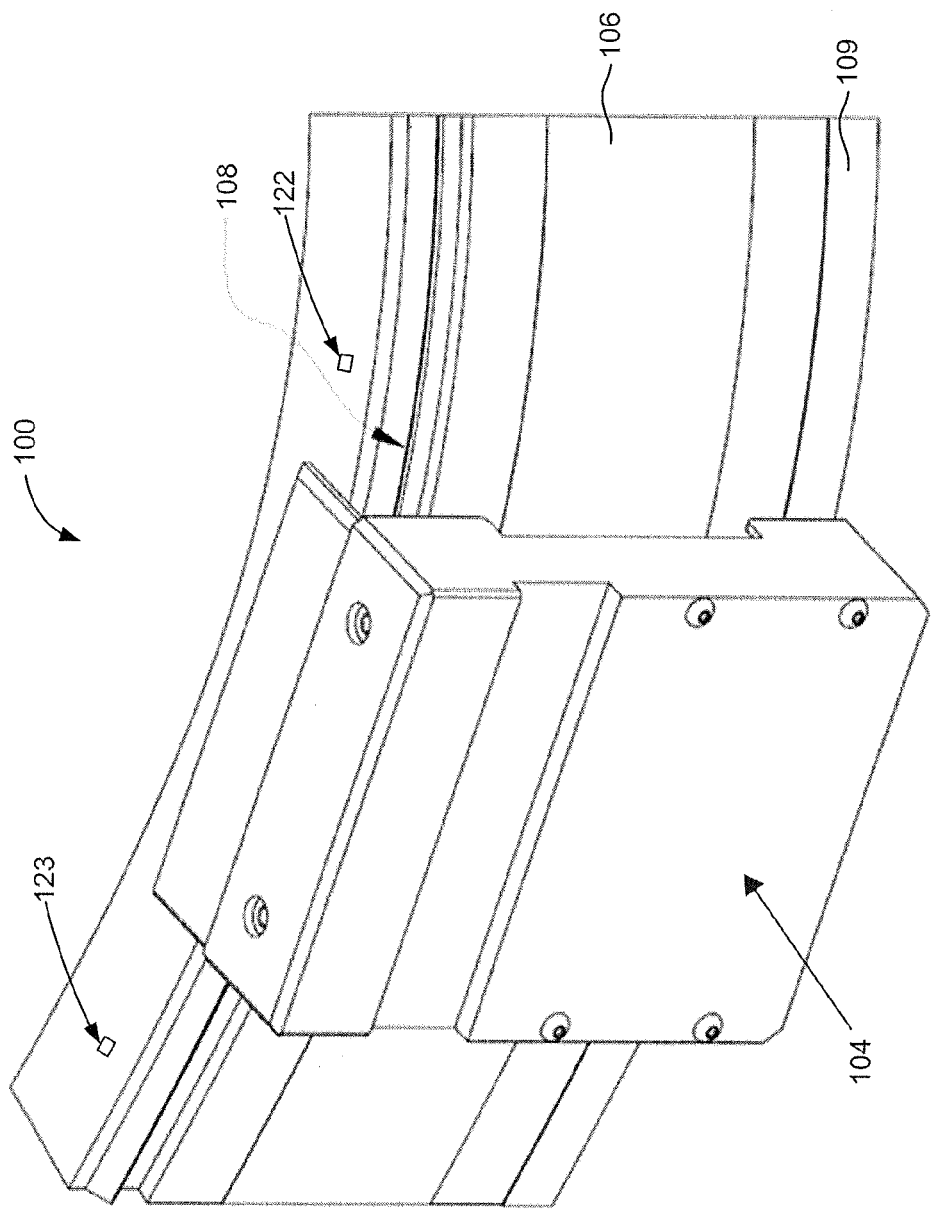
FIG. 3 illustrates a perspective view of a track section with a curvilinear profile.

FIG. 3 illustrates a conveyor system 100 having a curvilinear profile, in accordance with a further embodiment. Where the track section 102 is curvilinear, the sensors 122, 123 are positioned along the curvilinear profile such that the machine readable medium 120 can be read by the sensors 122, 123 and the readings are then translated from the curvilinear profile to a linear profile, using linear units such as microns, for the purposes of feedback control. Control of the moving element 104 then occurs in the linear profile/linear units.

Figure 4A:
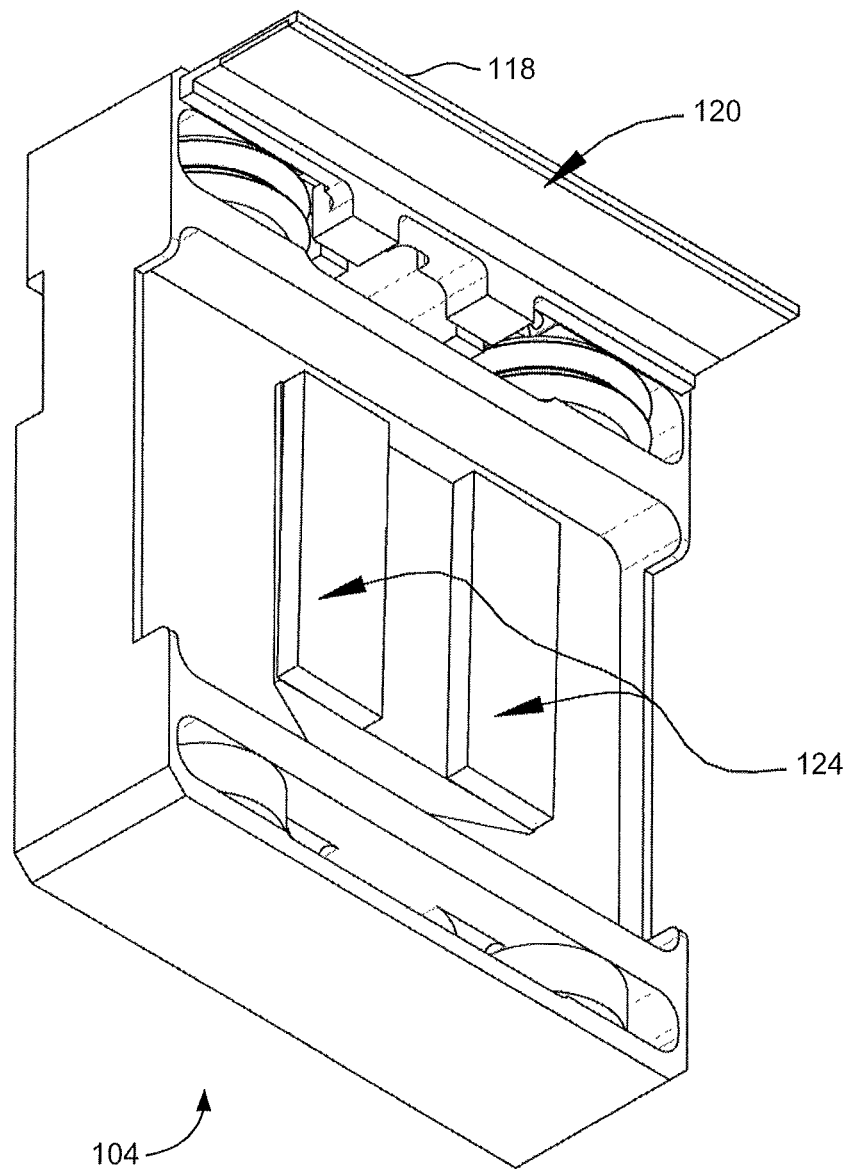
FIG. 4A illustrates a perspective view of a moving element.
Figure 4B:
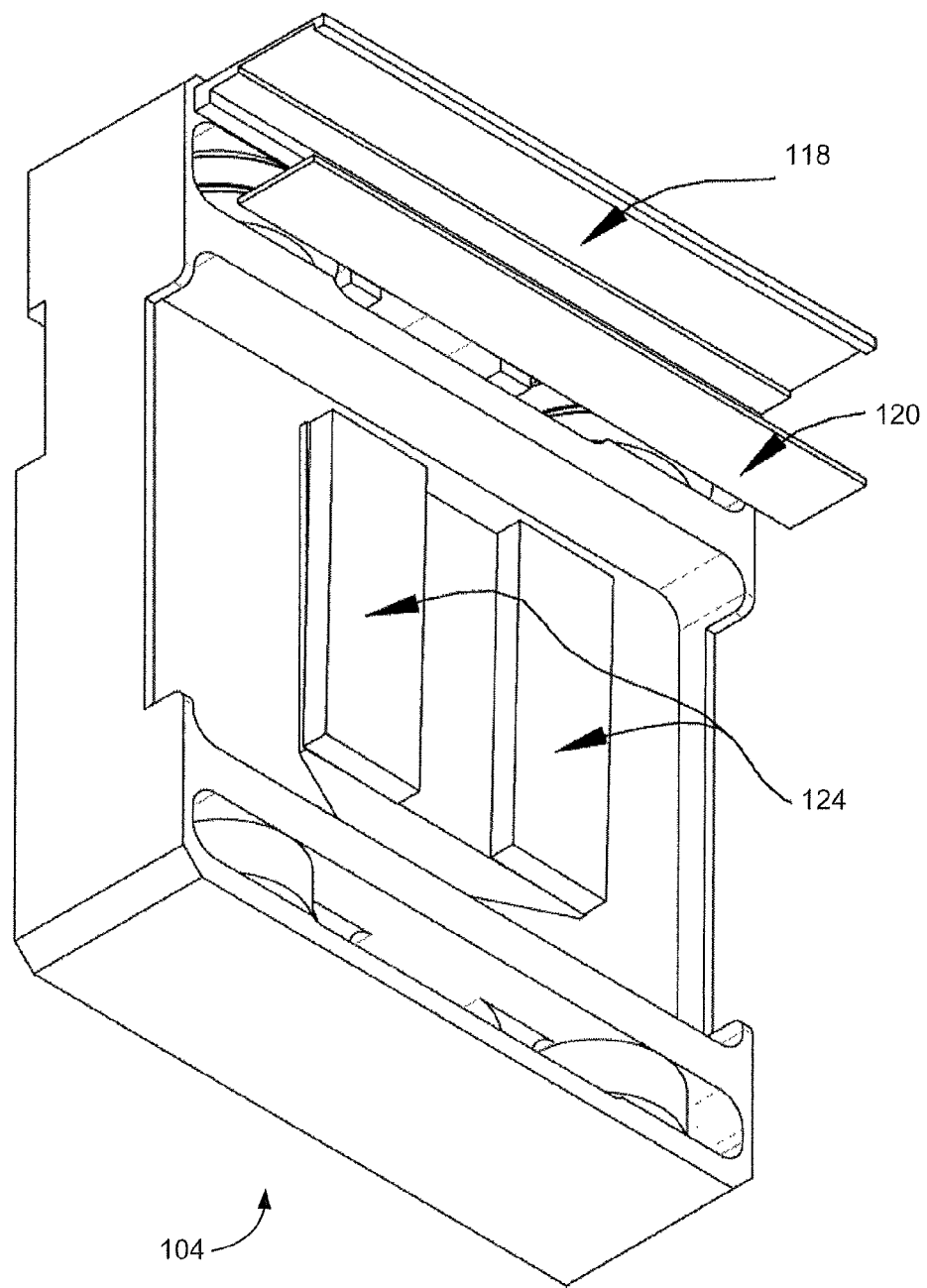
FIG. 4B illustrates a perspective view of a moving element separated from a machine readable medium.

FIGS. 4A and 4B show a moving element 104 when removed from the track 106. The moving element 104 has the machine readable medium 120 on the extension 118. The machine readable medium 120 is read by the sensors 122, 123 to determine the moving element's position as the moving element 104 travels along the track 106. This position feedback is then used to control the movement of the moving element 104. The moving element 104 has elements 124, such as permanent magnets, that interact with the stator armature 112 and coils 114 in the corresponding track section 102 to move along direction 126 of FIG. 1.

Figure 5:
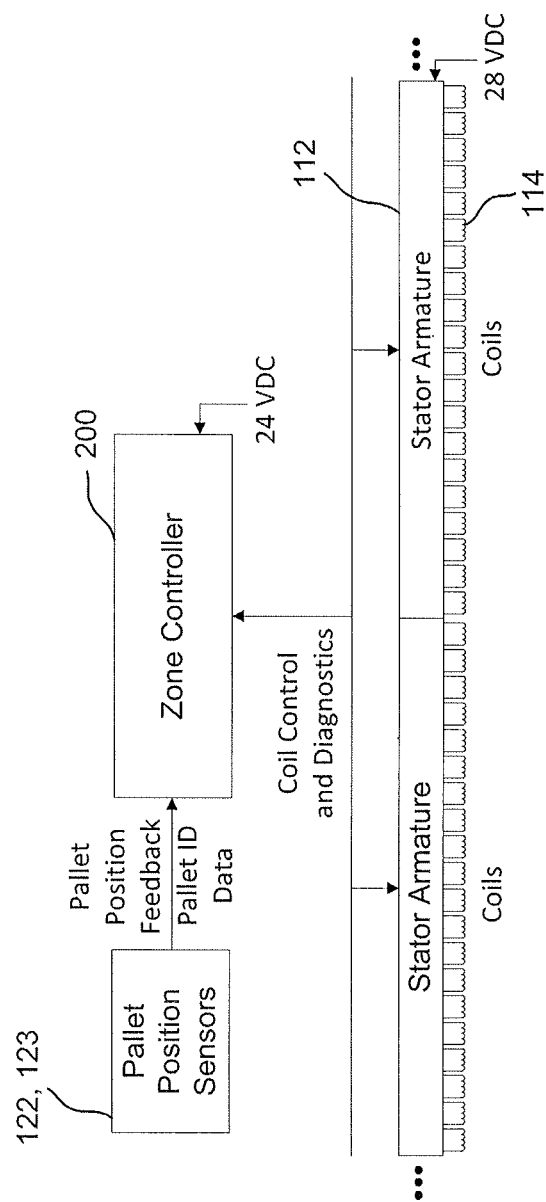
FIG. 5 is a schematic of a control architecture for a conveyor system, according to an embodiment.

FIG. 5 is a block diagram of an embodiment of a control architecture 201 employed in the conveyor system 100. Zone controller 200 controls a zone of the conveyor system 100 and the track 102 used in the zone of the conveyor system 100. A zone may include any number of coils. The coils may be grouped into 'motors'. In a particular example, a motor may include twenty interleaved coils. The motors may be equivalent in length to track sections 102; however this is not required as motors can include coils from more than one, or less than one, track section 102. The zone controller 200 may be used to interface with users of the system. The zone controller 200 is configured to monitor moving element 104 positions and control the movement of moving elements 104 to go to desired destinations based on the moving element position. As such, the zone controller 200 can be used for process (i.e. manufacturing-line) control. The zone controller 200 may also provide a supervisory diagnostic role by monitoring the track sections 102 (e.g., by engaging in a continuous polling or pushing process) in order to determine the current status of any track section 102 and whether any track section 102 has failed. It will be understood that, in some cases, the zone controller 200 may directly control each of the track sections 102 or each of the motors.

The zone controller 200 may also be connected to other devices, such as programmable logic controllers (PLCs) (not shown) via input/output (I/O), network modules, software modules, Ethernet connections, or the like. The PLCs may provide manufacturing-line station-processing instructions to the zone controller 200, such as directing the next destination for a moving element 104 along the track 102, or providing station-specific motion instructions in respect of a given moving element 104.

As illustrated, the zone controller 200 is connected to the stator armature 112 and coils 114 in the track sections 102 and controls the coils 114 in accordance with an independent trajectory or "move" command for each moving element 104 located therein.

The zone controller 200 is also operatively connected to the sensors 122 situated in the track section 102. The zone controller 200 is used to implement a closed-loop digital servo control system that controls movement of the moving element 104 by resolving the real-time position of each moving element 104 located in the track section 102. When the machine readable medium 120 of a given moving element 104 moves over a given sensor 122, moving element position feedback is transmitted to the zone controller 200. The zone controller 200 decodes the moving element position feedback to determine the position of the moving element 104.

The zone controller 200 provides processing for sampling the sensors 122, 123 and resolving the position of each moving element 104 located in the associated track section 102. Broadly speaking, the processing associates the machine readable medium 120 of any given moving element 104 with the identified sensor 122, 123 at any time so that a position, relative to the track section 102, of the given moving element 104 can be calculated based on a fixed position of the associated sensor 122, 123 and a relative position of the machine readable medium 120 in relation to the associated sensor 122, 123. In addition, when the machine readable medium 120 simultaneously engages a plurality of sensors 122, 123, the processing transfers or hands-off the association or "ownership" of the moving element 104 from the current sensor 122, 123 to an adjacent engaged sensor 122, 123. In this manner, the position of an identified moving element 104 relative to the track section 102 can be continuously tracked.

Those skilled in the art will appreciate that the position sensing system may be magnetic, optical, color optical, capacitive, or may be another alternative system. For example, the machine readable medium can be a magnetic strip and the sensors 122, 123 can be corresponding magnetic detectors. Such an embodiment may provide very fine resolution. In some cases the machine readable medium can be configured to provide 1 micron or better resolution. The position accuracy of the moving element 104 is only limited by the resolution of the position sensing system.

Figure 6:
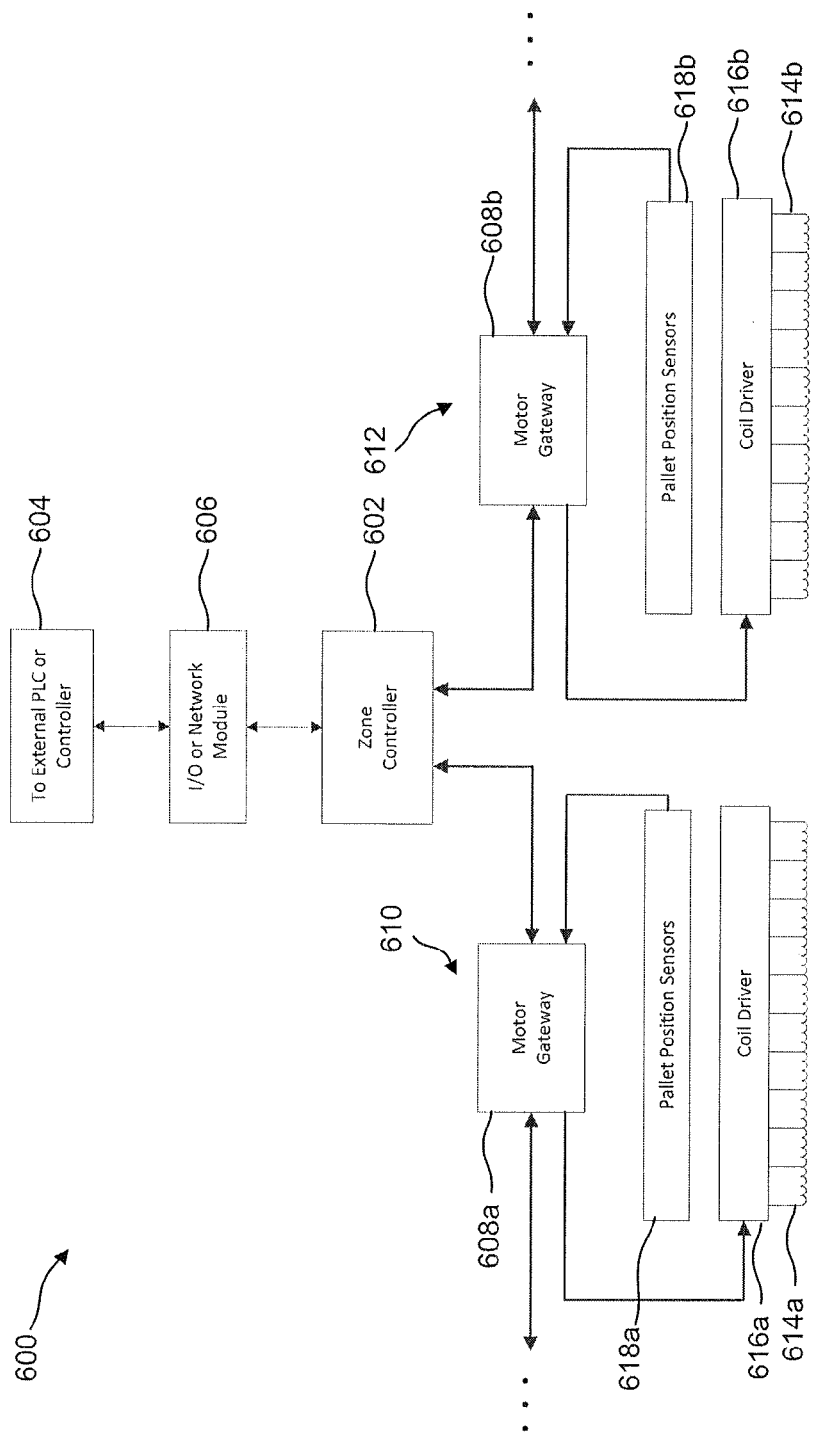
FIG. 6 is a schematic of a control architecture for a conveyor system, according to another embodiment.

FIG. 6 illustrates another embodiment of a control architecture 600 for a linear motor conveyor. In this embodiment, the control architecture 600 includes a zone controller 602. The zone controller 602 may be connected to other devices, such as programmable logic controllers (PLCs) 604 via input/output (I/O), network modules, software modules, Ethernet connections, or the like 606.

The zone controller 602 interfaces with and controls one or more motor gateways 608. In this example, as will be discussed, the motor gateway 608a is located on a first network 610 of motor gateways (referred to as a left network) and motor gateway 608b is located on a second network 612 of motor gateways (referred to as a right network). In some cases, the network may be a serial link operatively connected with the one or more motor gateways. Each network 610, 612 may have the motor gateways 608 connected in series. In some cases, each network 610, 612 may include two independent communication channels, a "command channel" and a "response channel". The channels may have bidirectional or unidirectional data flow, and may operate independently of each other. The command channel may be responsible for transmitting data from the zone controller 602 to the motor gateways 608, or from one motor gateway to another motor gateway, and the response channel may be responsible for transmitting data from the motor gateways 608 to the zone controller 602.

Each motor gateway 608 is associated with a portion of the conveyor track and assigned to or associated with at least one network. Each motor gateway 608 controls a number of coils grouped into a 'motor' 614 through power electronics circuits, in this case a coil driver 616. The coil drivers 616 contain circuitry that drives current to the coils in the motor 614. The power electronics may also include thermistors (not shown) for temperature monitoring. The motor gateways 608 send coil current set point data to the coil driver 616. The motor gateways 608 also receive moving element raw position data from the moving element position sensors 618 which may be passed along to the zone controller 602. As such, the zone controller 602 and motor gateways 608 are configured to communicate data related to the moving elements or related to control of the moving elements, via the left network 610 and right network 612 in a structured manner as detailed herein.

In some cases, the processing of the position, and the driving, of the moving element will take place solely in the zone controller 602. The motor gateways 608 will relay raw position sensor data to the zone controller 602. In addition, the motor gateways 608 will receive coil current set points from the zone controller 602 to drive the coil driver 616. The processing of the input raw position data to output the coil current set points may be centralized in the zone controller 602. In further cases, the motor gateways 608 may have a feedback control structure to ensure the coils in the motor 614 do not substantially deviate from the coil current set point received from the zone controller 602.

In some cases, the conveyor may have a plurality of zone controllers, a plurality of left and right networks associated with the plurality of zone controllers and a plurality of motor gateways associated with the plurality of left and right networks.

Figure 7A:
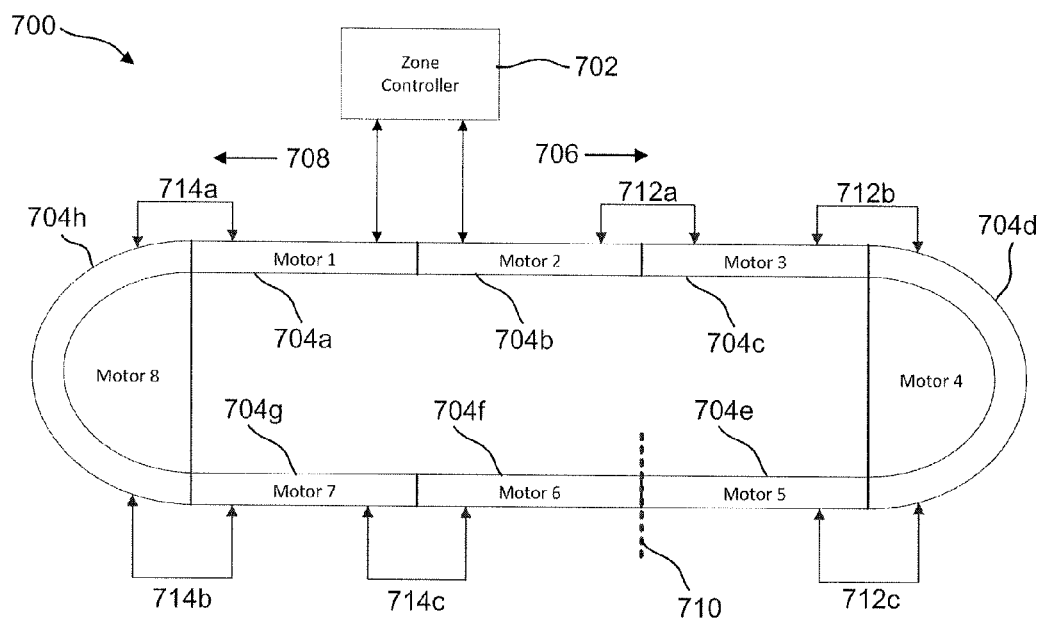
FIG. 7A is a schematic of a conveyor system with one zone.
Figure 8:
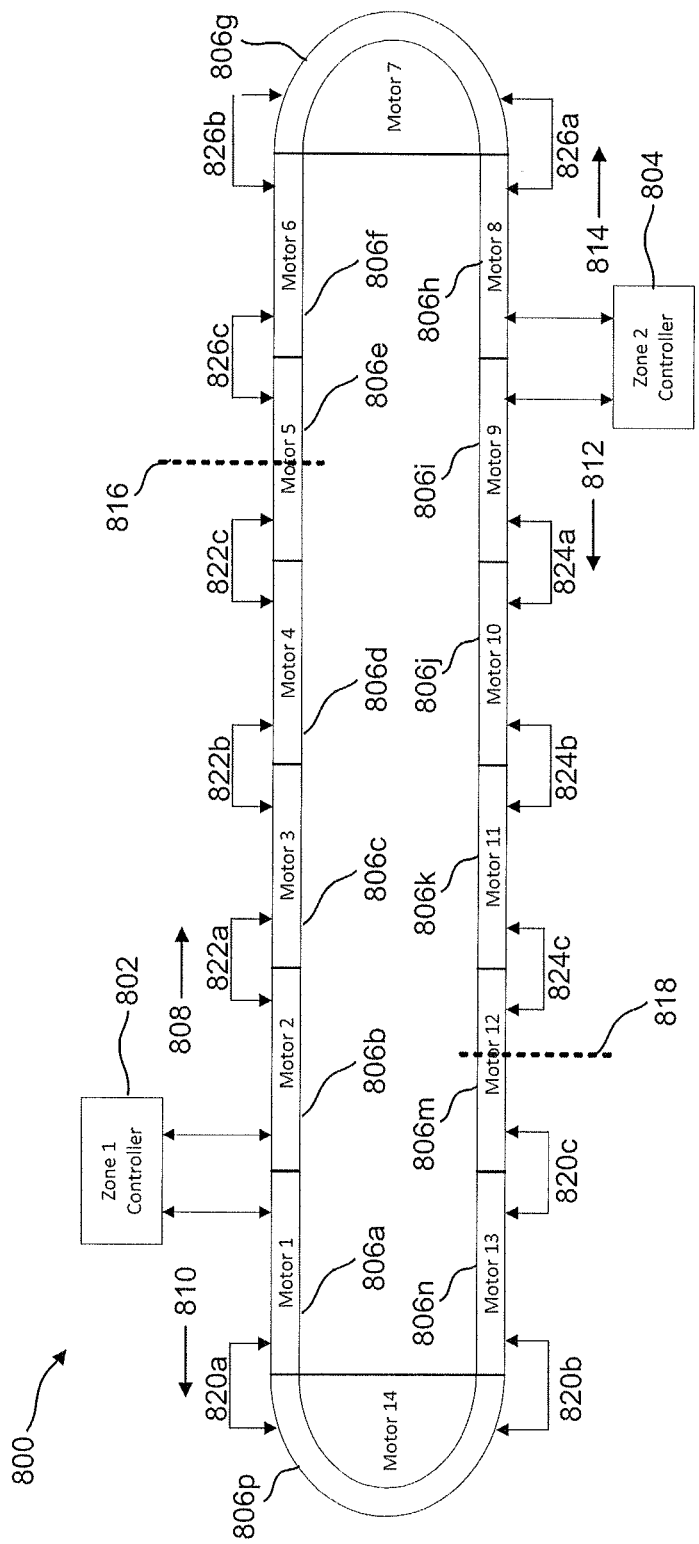
FIG. 8 is a schematic of a conveyor system with two zones and overlapping regions.

As shown in the schematic views of FIGS. 7A and 8, a conveyor 700, 800 can be subdivided into one or more zones. In the example of FIG. 7A, the conveyor 700 has one zone with one zone controller 702. In the example of FIG. 8, the conveyor 800 is subdivided into two zones; with a first zone having an associated zone controller 802 and a second zone have an associated zone controller 804. Each zone controller can control a multiplicity of motors (via motor gateways). In the example of FIG. 7A, the zone controller 702 controls eight motors 704a to 704h, and thus, interfaces with eight motor gateways (not shown).

In further cases, there may be more zones as the ability to subdivide into zones allows conveyor systems 700 to scale up in size by further sub-division into further zones. With the ability to sub-divide into further zones, each of which having a configurable number of motors 704, it is intended that processing power will not provide a constraint on the scaled-up conveyor 700. This is due to the fact that as the conveyor system 700 scales up in size, more zones can be incorporated. The number of controlled zones is likely only bounded by the total number of motors 704 on the conveyor system 700.

As well, it is intended that having a plurality of zones of configurable size will allow conveyor systems 700 to scale up without network bandwidth becoming a constraint. To further reduce network bandwidth constraints, the conveyor 700 can have multiple control networks in order to increase bandwidth and increase the maximum zone size a zone controller 702 can support.

Figure 7B:
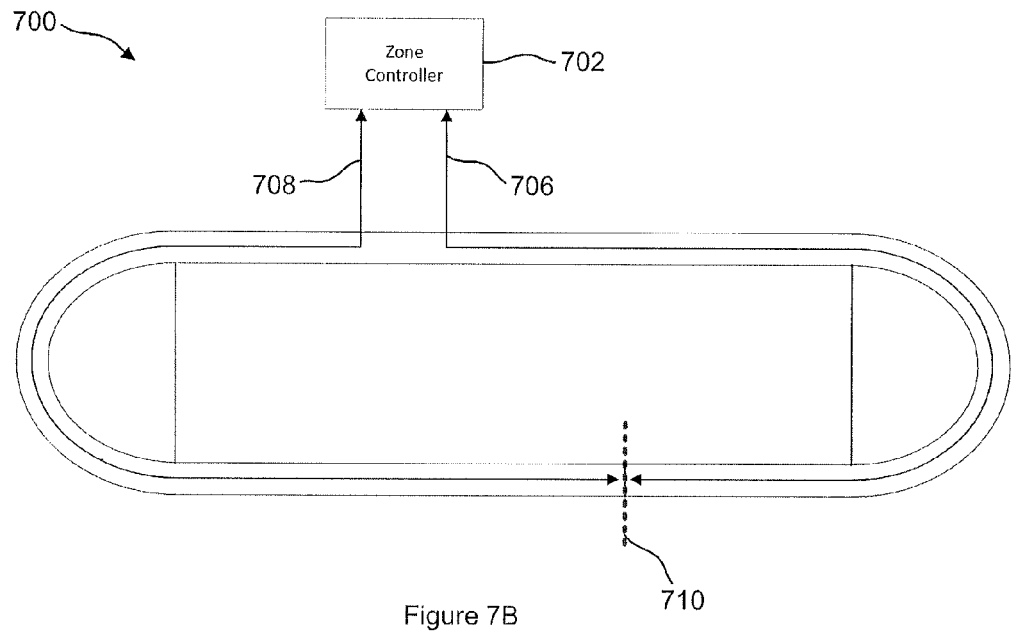
FIG. 7B is a schematic of the conveyor system illustrating two networks of motors.

In the example of FIGS. 7A and 7B, the conveyor 700 has two control networks, a left network 706 of motors 704b, 704c, 704d and 704e, and a right network 708 of motors 704a, 704f, 704g and 704h. The networks 706, 708 each start at the motors closest to the zone controller 702, in this case motor 704a for the right network 708 and motor 704b for the left network 706. The networks 706, 708 each end at the point farthest away from the zone controller 702, in this case the point 710 in between motor 704f and motor 704e. The networks 706, 708 are illustrated in FIG. 7B for clarity. In other cases, the networks 706, 708 may have different quantities of motors 704 and therefore the networks 706, 708 may end on any point in the conveyor 700 as long as there is at least one motor 704 in between the zone controller 702 and the end point 710 on each network 706, 708. In a further example, each network 706, 708 can have its own zone controller 702. Thus, as a conveyor system 700 scales up in size, each network 706, 708 does not burden the other networks 706, 708 with its bandwidth traffic.

Moving elements on linear motor conveyors can travel at high speeds. Moving element position information can be high resolution and changing at a rapid rate when a moving element is moving. For smooth control, there should not be discontinuities in time with the moving element position information. For example, if moving element position information is current while other moving element position information is delayed by 100 microseconds due to network and processing delays, the control of each moving element may not be smooth and seamless across the discontinuity when using the moving element position data (if a moving element travels at an exemplary rate of 2.5 m/sec, it can travel 0.25 mm in 100 μsec, which can be enough of a discontinuity to negatively impact control). The moving element could have moved a significant distance in this time which could cause an unwanted jump in control of the moving element. Similarly, for smooth control there should not be discontinuities in coil current set points. If certain coil current set points are just calculated, while others were calculated 100 microseconds ago, the control of the moving element may not be smooth and seamless due to coil current set points with a time discontinuity influencing the same moving element. The moving element may have moved a significant distance during the discontinuity such that the older coil current set points may be off relative to the newer coil current set points.

An approach to handling timing discontinuities across networks may be to apply Institute of Electrical and Electronics Engineers (IEEE) Standard 1588 which describes a precision time protocol (PTP). This time protocol synchronizes all clocks within a network by adjusting clocks to the highest quality clock. Timestamps in the messages sent across the network are corrected for time spent traversing the network. However, this standard may require adding some measure of complexity to the conveyor system through the requirement for clock synchronization.

Another approach may be to take a snapshot of all moving element position information at roughly a singular instant in time and use this moving element position information snapshot for further moving element control. The zone controller 702 may then perform moving element control calculations on a full data set that avoids time discontinuities in moving element position information. Similarly, the zone controller 702 may send out coil current set points that get queued throughout motors 704 in the zone. The coil current set points could then be applied at substantially the same instant in time. This may avoid time discontinuities without negatively impacting moving element control. While this approach avoids time discontinuities in moving element position information and/or coil current set points, it may introduce lags in moving element control as the zone controller 702 may not be operating on the latest moving element position information available and may not be updating coil current set points as quickly as possible.

In some cases, it may be possible to avoid time discontinuities through the network configuration, as shown in FIG. 7A. In the following discussion, "moving element position information" is intended to refer to the moving element position relative to the track as calculated by the zone controller whereas "position data" or "raw position data" is intended to refer to the raw sensor data that is collected by the sensor, and in these embodiments, is generally transmitted via the motor gateways without analysis.

In FIGS. 7A and 7B, if the right network 708 started transmitting moving element position data from the right side of motor 704a and at the same time the left network 706 started transmitting moving element position data from the left side of motor 704b, there may be no discontinuity in the moving element position data across the gap between motors 704a and 704b. The moving element position data bordering the gap between these motors is taken at substantially the same instant in time. Then, moving element position data would be transmitted from each motor 704 in order around each network 706, 708 to the zone controller 702. The right network 708 may transmit moving element position data from motor 704a; then from motor 704h across boundary 714a through motor 704a; then from motor 704g, across boundary 714b, through motor 704h, across boundary 714a and through motor 704a; and then from motor 704f, across boundary 714c, through motor 704g, across boundary 714b, through motor 704h, across boundary 714a and through motor 704a. The left network 706 may transmit moving element position data from motor 704b; then from motor 704c, across boundary 712a and through motor 704b; then from motor 704d, across boundary 712b, through motor 704c, across boundary 712a, and through motor 704b; and then from motor 704e, across boundary 712c, through motor 704d, across boundary 712b, through motor 704c, across boundary 712a, and through motor 704b. Thus, the zone controller 702 may receive the moving element position data in the predetermined order. In a further case, the order can be reversed, in which the outermost motors 704e, 704f from the zone controller 702 send their moving element position data first and the innermost motors 704a, 704b send their moving element position data last.

It is intended that the moving element position data at point 710 will also not have a discontinuity in time when the network propagation delays are consistent and the right network 708 and left network 706 are fairly similar in length. The moving element position data at point 710 would be sent to the zone controller 702 at substantially the same time on both networks 706, 708. Any discontinuities across the boundaries 712, 714 with this configuration are believed to be negligible relative to the timing of moving element control.

A similar approach can be used to avoid time discontinuities when setting coil current set points. After performing the coil current calculations, the zone controller 702 may first send the coil current set points to the innermost motors, motor 704a on the right network 708 and motor 704b on the left network 706. Since the data would be sent at substantially the same time, there should not be a significant discontinuity in time across the gap between motor 704a and motor 704b when updating coil currents. The zone controller 702 then sends coil current set points to each motor in order around each network ending with the outermost motors, motor 704f on the right network 708 and motor 704e on the left network 706. As long as the right and left network latencies are similar, there will not be a significant time discontinuity at point 710 when setting coil currents. In this way, the conveyor 700 configuration is intended to inherently avoid discontinuities in time.

Figure 9:
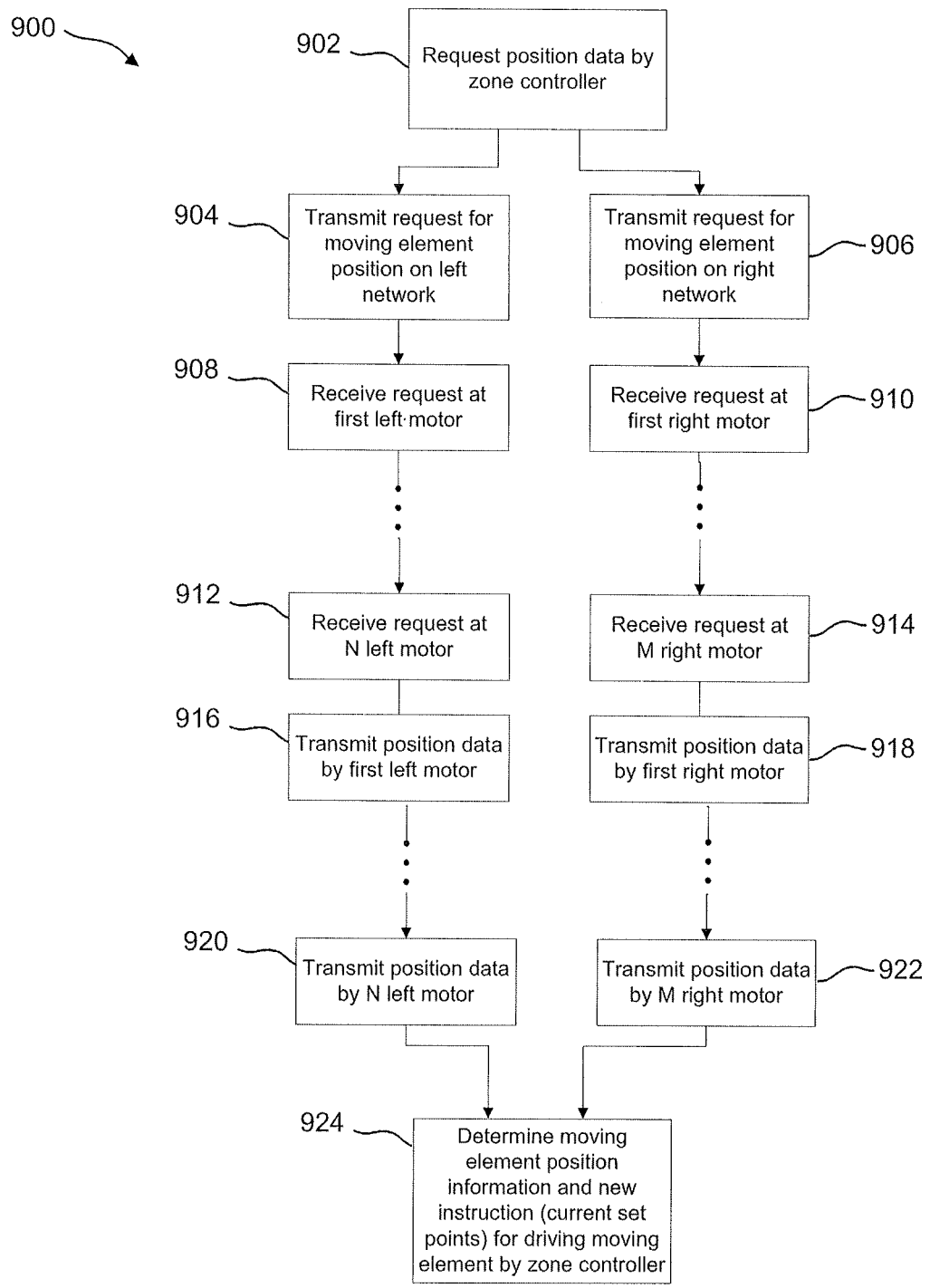
FIG. 9 is a flowchart for a method of determining the position of a moving element in a linear motor conveyor, according to an embodiment.

Turning to FIG. 9, a flowchart for an embodiment of a method 900 of determining the position of a moving element in a linear motor conveyor is shown. At 902, the zone controller 702 requests position data for moving elements in the conveyor 700. At 904, the zone controller 702 transmits the request to the left network 706 of motors. At 906, at substantially the same time, the zone controller 702 transmits the request to the right network 708 of motors.

The request for position data and responses can be communicated between the zone controller 702 and the motor gateways of the motors on each network in a structured manner using, for example, a timing sequence, a latching sequence, or an event driven sequence. Some examples of these techniques are provided herein but, upon reading the description, one of skill in the art will also understand that other techniques may be available.

In the present example, the zone controller 702 sends the request for position data to all motors at the same time. In an alternate case, the zone controller 702 may wait for a predetermined structured latency period before sending its request to each successive motor gateway on the network. For example, having regard to current network capabilities, the zone controller may wait 0 µs before sending a request to the innermost motor gateway, then the zone controller 702 waits 20 µs before sending the request to the next motor gateway, and so on.

At 908, the request for position data is received by the motor gateway of the innermost motor 704b on the left network 706, being the motor closest to the zone controller 702. Similarly, at 910, the request for position data is received by the motor gateway of the innermost motor 704a on the right network 708, being the motor closest to the zone controller 702. In other cases, the request for data may be transmitted to be received by the outermost motor to the innermost motor.

Then, in order, the motor gateways of the next closest motors to the zone controller 702 receive the request. On the left network 706, if there are 'N' number of motors on the network, each motor gateway receives the request in order until, at 912, the motor gateway on the Nth motor 704e (being the outermost motor farthest away from the zone controller 702) receives the request. On the right network 708, if there are 'M' number of motors on the network, each motor gateway receives the request in order until, at 914, the motor gateway on the Mth motor 704f (being the outermost motor farthest away from the zone controller 702) receives the request.

The motor gateways on each network then transmit the position data to the zone controller 702, in this example, in a structured manner based on timing. In the situation where the zone controller sends a request to be received by all of the motor gateways, each motor gateway may wait for a predetermined structured latency period before transmitting its moving element position data on the network. For example, the outermost motor gateway waits 0 µs, the next outermost motor waits 20 µs before transmitting its position data, the next outermost motor waits 40 µs before transmitting its position data, and so on. This can ensure that the data is not corrupted by the motor gateways on the same network trying to send data simultaneously. In the case where the zone controller has communicated separate commands to each of the motor gateways and has included a time delay prior to communicating each message, the motor gateways may respond as soon as the data is available.

At 916, the motor gateway of the first motor 704b on the left network 706 transmits its moving element position data to the zone controller 702. Similarly, at 918, the first motor 704a on the right network 708 transmits its moving element position data to the zone controller 702.

Then, in order, the motor gateways of the next farthest motors from the zone controller 702 transmit their moving element position data. On the left network 706, each motor gateway transmits its moving element position data in order until, at 920, the motor gateway on the outermost motor 704e (being the motor furthest from the zone controller 702) transmits its position data. On the right network 708, each motor gateway transmits its moving element position data in order until, at 922, the motor gateway on the outermost motor 704f (being the motor furthest from the zone controller 702) transmits its position data. Each consecutive motor gateway on each of the left and right networks may wait a predetermined threshold time prior to transmitting its moving element position data. In some cases, the predetermined threshold time may be for example, 0.1 µs, 1 µs, 20 µs, 50 µs, or the like. In other cases, the predetermined threshold time may be calculated as the time each motor gateway takes to prepare and transmit the requested data.

After all the moving element position data is received by the zone controller 702, at 924, the zone controller 702 can then analyze the position data to determine moving element position information and determine a new instruction for driving the moving element (e.g. new current set points for the motors).

It will be understood that the structured manner based on timing in which the motor gateways on each network receive the moving element position data request can be in the order of outermost motor receiving the request first, followed by the next outermost motor, and so on, until the innermost motor receives the request or can be in the order of innermost motor transmitting the data first, followed by the next innermost motor, and so on, until the outermost motor transmits its data as long as the timing is structured to avoid data collisions or the like.

For example, the structured manner based on timing in which the motor gateways on each network transmit their moving element position data can be based on building a package of data. The motor gateway of the outermost motor on a network can start the data package by sending its data to the motor gateway of the next outermost motor. That next outermost motor appends, in a structured manner, its moving element position data to the data it received from the outermost motor to form a data package. Then, in order, each motor gateway appends its position data to the data package until the innermost motor appends its position data to the data package. The data package is then transmitted to the zone controller 702 for unpackaging and use.

In another example, the structured manner may include another timing sequence. The zone controller may transmit a separate command to the innermost motor gateway and may wait to receive the response prior to transmitting a next separate command to the next innermost motor gateway. After the receipt of each response from the motor gateway, the zone controller will transmit the next command until the zone controller receives a response from the outermost motor gateway. As with other methods, it will be understood that this method could also be used from outermost motor gateway to innermost motor gateway.

In still another example, the structured manner may include a latching sequence. In this case, the zone controller sends a short request or command to both the left network and the right network. The request is intended to travel through all the motor gateways associated with each network. When the request is received, each motor gateway will latch the current encoder position readings or store the values at the time of receiving the request. Each motor gateway is intended to have a snapshot of the encoder readings at approximately the same instant in time, the readings are intended to only be delayed by the short amount of time the request takes to propagate from one motor gateway to the others in each network. After the snapshot is taken by each motor gateway, the motor gateways send this latched position information to the zone controllers in an appropriate manner as described herein or otherwise known. It is intended that the latched position information is taken by each motor gateway at approximately the same instant so time discontinuities are generally reduced.

A similar latching concept may also be applied to setting coil current set points to reduce time discontinuities. In this example, all the coil set points may be sent to the motor gateways and each motor gateway temporarily stores these values. A second command may be sent by the zone controller to apply the coil current set points currently being stored by the motor gateways at a predetermined time.

Turning to the example of FIG. 8, the conveyor system 800 has two zones with a first zone controller 802 and a second zone controller 804. The first zone controller 802 has a right network 810 consisting of motors 806a, 806p, 806n and 806m with boundaries 820a, 820b and 820c. The first zone controller 802 also has a left network 808 consisting of motors 806b, 806c, 806d and 806e with boundaries 822a, 822b and 822c. The second zone controller 804 has a right network 812 consisting of motors 806i, 806j, 806k and 806m with boundaries 824a, 824b and 824c. The second zone controller 804 also has a left network 814 consisting of motors 806h, 806g, 806f and 806e with boundaries 826a, 826b and 826c.

The boundary point 816 between the left network 814 of the second zone controller 804 and the left network 808 of the first zone controller 802 is located within motor 806e such that motor 806e is located on both networks 808, 814. Similarly, the boundary point 818 between the right network 812 of the second zone controller 804 and the right network 810 of the first zone controller 802 is located within motor 806m such that motor 806m is located on both networks 810, 812.

In order to support multiple zones, moving elements need to be controlled across the transitions from one zone to another. When a moving element crosses a zone boundary 816, 818, the control of the current in the coils of the motor has to accommodate smooth motion across the boundary as the magnets on the moving elements cross coils from one zone to the other. The moving element position information and moving element control also need to hand off from one zone controller to the other.

An approach to perform moving element handoff at the boundary between zones is to configure a motor to be a dual slave that communicates with multiple networks. This is illustrated in FIG. 8 in which motor 806e is a dual slave to the left network 814 of zone controller 802 and to the left network 808 of zone controller 804. Similarly, motor 806m is a dual slave to the right network 810 of zone controller 802 and to the right network 812 of zone controller 804. In further cases, the overlapping region can include more than one motor or include just a portion of a motor.

A dual slave motor, such as 806m or 806e, sends moving element position information to two zone controllers 802, 804 and receives coil current set points from the two zone controllers 802, 804. This approach is intended to be advantageous as it provides a region to seamlessly transition moving elements from one zone to the other. Since the two zone controllers 802, 804 receive the identical moving element position information for the dual slave motors 806m, 806e, there are no time discontinuities for the boundary points 816, 818. The two zone controllers 802, 804 are also both able to send coil current set points to the motor gateways of the dual slave motors 806e, 806m. Thus, time discontinuities for coil currents are avoided without requiring complex sharing of coil current control across zone boundaries.

With the approach illustrated in FIG. 8, both zone controllers 802, 804 can read moving element positions and command coil currents across the dual slave motors 806e, 806m. The motors 806e, 806m then can use coil current set points received from one of the zone controllers 802, 804 at any given time. In one case, the motor gateway of the dual slave motors 806e, 806m will choose the coil current set point based on latency; for example, the motor gateway will use the first or earliest coil current set point received regardless of which zone controller 802, 804 the coil current set point came from.

In another case, the zone controllers 802, 804 will choose the coil current set point based on a handoff position. For example, there may be a predetermined position within the dual slave motor 806e, 806m for coil current handoff. When the moving element crosses the predetermined position, the motor gateway of the dual slave motor 806e, 806m would start receiving coil current set points from the other zone controller 802, 804 that was not previously sending in coil current set points. As both zone controllers 802, 804 receive position data from the motor gateway of the dual slave motor 806e, 806m, and because both zone controllers 802, 804 have substantially the same logic, there will be coordination as to when coil current set point control is handed off at the handoff position. This is intended to provide a simple and seamless control transition.

Figure 11:
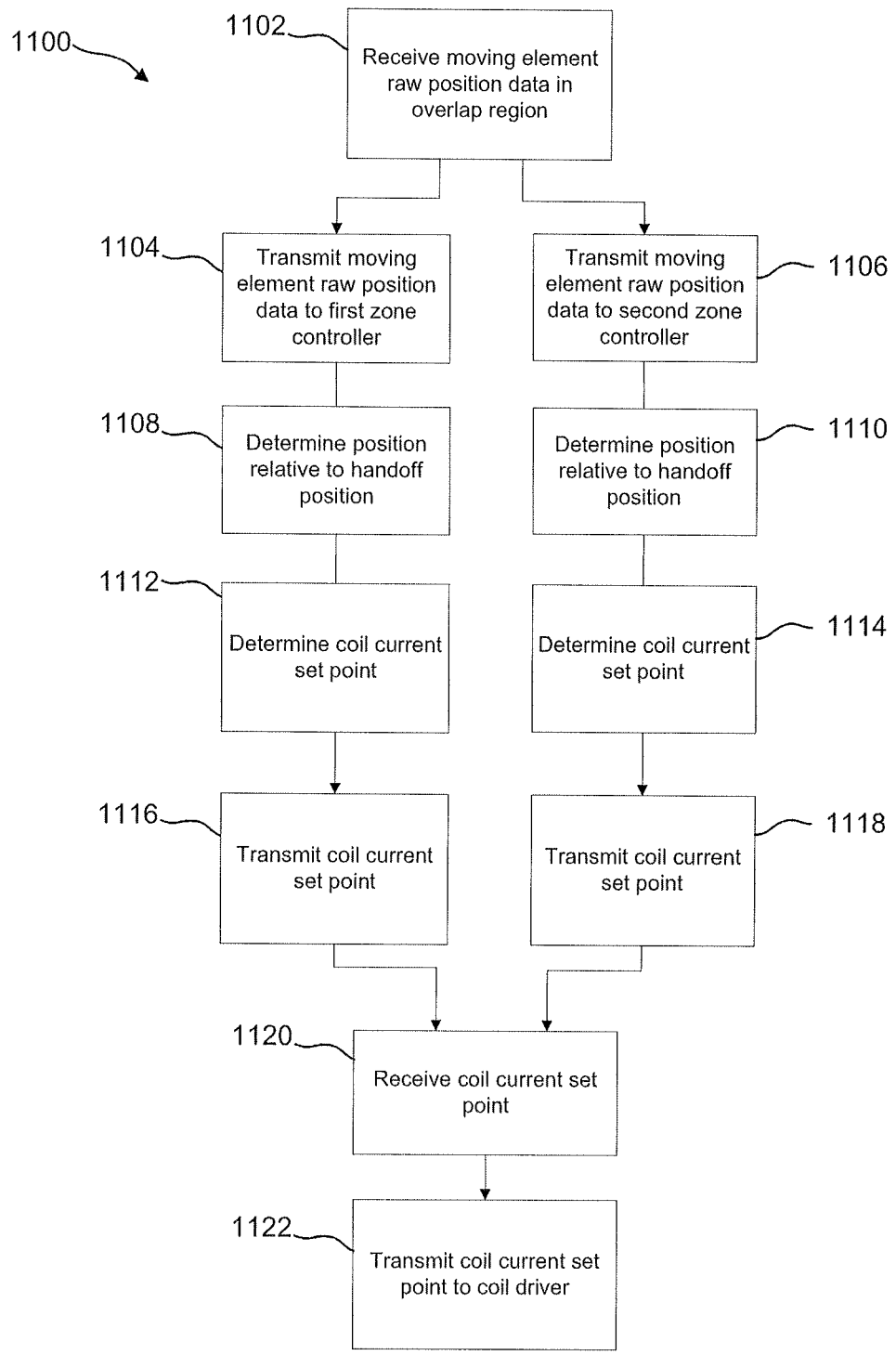
FIG. 11 is a flowchart for a method of handling handoff of a moving element in a linear motor conveyor, according to an embodiment.

As moving elements in linear motor conveyors 800 can move forward and backward, it is possible that control of the coil current may be passed back and forth between zone controllers 802, 804 multiple times while the moving element is within the dual slave motor 806e, 806m. In a particular case, as shown in FIG. 11, a hysteresis band may be implemented for the dual slave motor 806e, 806m such that the predetermined position at which moving element control passes over when the moving element is going in a first direction may be slightly different than the predetermined position control switches back if the moving element reverses and moves in the opposite direction. This can prevent control repeatedly switching back and forth between zone controllers 802, 804 if a moving element oscillates about a single predetermined handoff position. As well, having an overlapping region of dual slave motors 806e, 806m can avoid time discontinuities that can occur with moving element position data, coil current set points or any other data transfers. An overlapping region is also intended to give zone controllers 802, 804 a range to work with for a simple, reliable, seamless transition that may be needed with moving elements moving at high speed.

Figure 10:
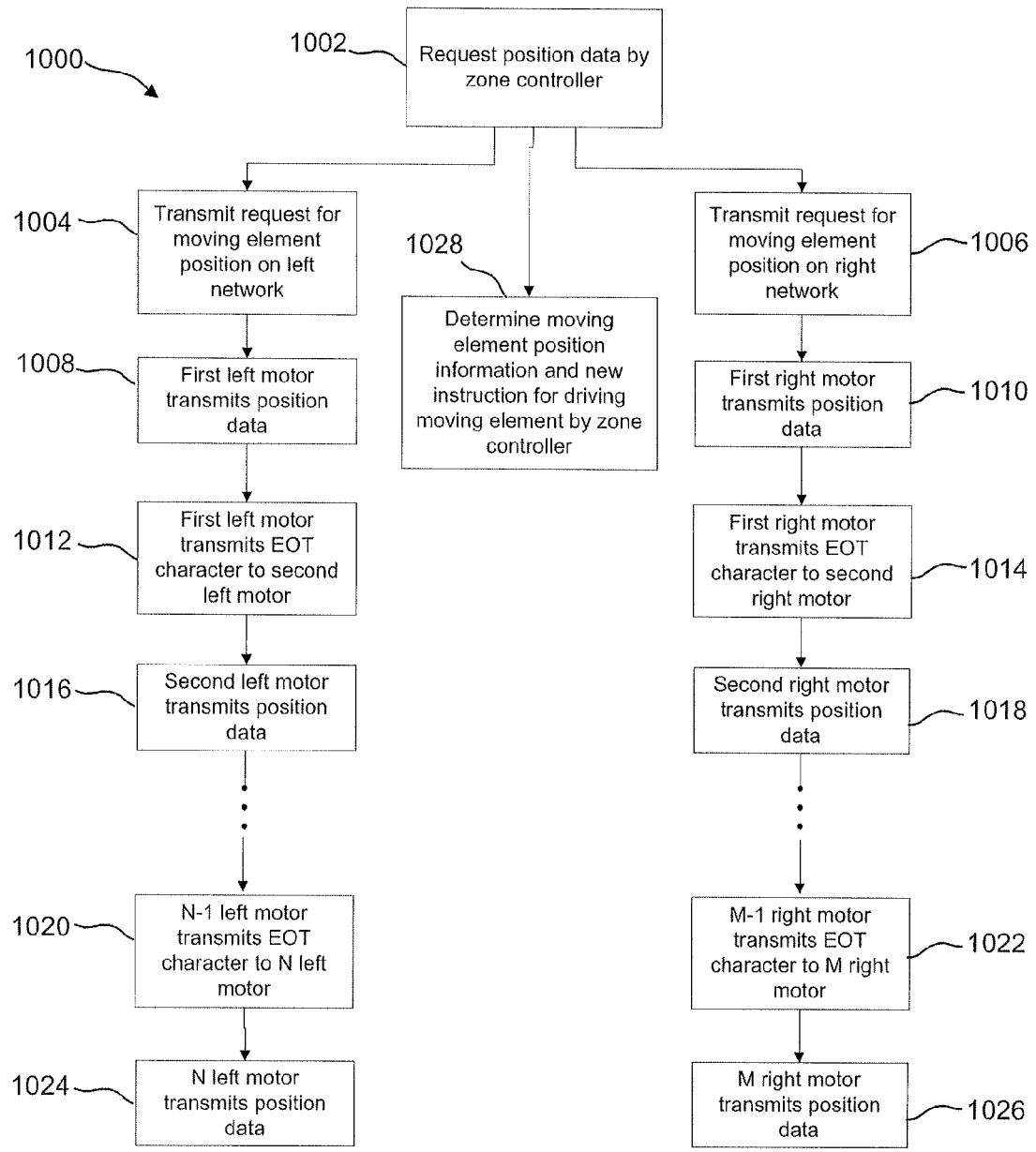
FIG. 10 is a flowchart for a method of determining the position of a moving element in a linear motor conveyor, according to another embodiment.

Turning to FIG. 10, a flowchart for another embodiment of a method 1000 of controlling of a moving element in a linear motor conveyor is shown. In this situation, an event driven scheme is used to communicate control data for the moving elements. At 1002, the zone controller 702 requests position data of a moving element in the conveyor 700. At 1004, the zone controller 702 transmits the request to the left network 706 of motors, for example, by transmitting a request on the command channel of the left network. The request for moving element position data is received by all the motor gateways on the left network 706. At 1006, at substantially the same time, the zone controller 702 transmits the request to all the motor gateways on the right network 708 of motors, for example on the command channel of the right network. The example of FIG. 10 illustrates two networks of motors; however, the approach of this embodiment may apply to one or more networks of motors.

At 1008, the motor gateway of the innermost (or first) motor 704b on the left network 706, being the motor closest to the zone controller 702, transmits its raw position data to the zone controller 702, for example on the response channel of the left network. Similarly, at 1010, the motor gateway of the innermost (or first) motor 704a on the right network 708, being the motor closest to the zone controller 702, transmits its raw position data to the zone controller 702, for example on the response channel of the right network.

At 1012, after the innermost motor 704*b* on the left network 706 has completed transmitting its raw position data to the zone controller 702, the motor gateway of the innermost motor 704*b* transmits an event indicator to the next innermost (or second) motor 704*c* on the left network 706, for example on the command channel of the left network. In an example, the indicator may be an "End-of-Transmission" (EOT) character. An EOT character may be any character that can be distinctively recognized to mean the transmission of position data has ended. At 1014, at substantially the same time, and after the innermost motor 704*a* on the right network 708 has completed transmitting its raw position data to the zone controller 702, the motor gateway of the innermost motor 704*a* on the right network 708 transmits an indicator, such as an EOT character, to the next innermost (or second) motor 704*h* on the right network 708, for example on the command channel on the right network. In some cases, the motor gateways can also send the EOT character to the zone controller 702. Further, in some cases, the event indicator may be sent just prior to completion of the transmission so there is no gap before the next transmission.

At 1016 and 1018, the motor gateways of the next most innermost motors 704*b*, 704*h* transmit their raw position data to the zone controller 702, on the response channel of the respective left or right network. Then, in order, the motor gateways of motors in each zone send their raw position data upon receiving an EOT character from the motor gateway of the preceding closest motor to the zone controller 702. On the left network 706, if there are 'N' number of motors on the network, each motor gateway transmits their raw position data until, at 1020, the motor gateway on the (N−1)th motor 704*d* transmits a EOT character to the motor gateway of the Nth motor (being the outermost motor farthest away from the zone controller 702). On the right network 708, if there are 'M' number of motors on the network, each motor gateway transmits their raw position data until, at 1022, the motor gateway on the (M−1)th motor 704*d* transmits a EOT character to the motor gateway of the Mth motor (being the outermost motor farthest away from the zone controller 702). At 1024 and 1026, the motor gateways of the Nth and Mth motors transmit their raw position data to the zone controller 702. At 1028, the zone controller 702 analyses the position data to calculate the moving element position information (e.g. position relative to the track) and determines a new instruction for driving the moving element. The new instruction may be determined after all the moving element position data is received by the zone controller 702, or after the zone controller 702 has received the moving element position data from one of the motors on a network but before the zone controller 702 has received the moving element position data from all the motors on that network. As the EOT character is only one character, there may be very little latency between successive motor gateways sending their raw position data to the zone controller 702. As the approach of FIG. 10 is essentially event-based, rather than time-based, latency may also be improved because zone controllers and motor gateways do not have to wait a certain period of time before completing tasks.

In some cases, a motor gateway may receive the raw position data from the sensors 122, 123 and hold it until the motor gateway receives an EOT from the next innermost motor, at which point the motor gateway will send the raw position data to the zone controller 702. In other cases, the motor gateway will only receive the raw position data from the sensors 122, 123 once the motor gateway receives an EOT from the next innermost motor, after which the motor gateway will send the raw position data to the zone controller 702.

In further cases, as the position data comes streaming into the zone controller from the motor gateways, the zone controller 702 can start doing calculations to determine coil current set points immediately. The zone controller 702 may not have to wait for all the position data to arrive before starting the calculations. Where there is a separate command channel and response channel, the zone controller 702 can simultaneously transmit coil current set points down the command channel to the motor gateways before all the raw position data has arrived, as the motor gateways will be transmitting position data on the response channel. Thus, the position data of the moving elements is intended to be recent as the zone controller does not have to wait for all motor gateways to send their raw position data. Further, the coil current set points being sent to the motor gateways may also be as recent as the coil current set points may be sent concurrently with the raw position data being received by the zone controller 702.

Turning to FIG. 11, a flowchart for an embodiment of a method 1100 of handling handoff of a moving element in a linear motor conveyor is shown. At 1102, a motor gateway of a dual slave motor 806*e*, 806*m*, located in the overlap region of two zones, receives the raw position data of a moving element from its position sensors.

At 1104, the motor gateway of the dual slave motor 806*e*, 806*m* sends the raw position data to the first zone controller 802. At 1106, at substantially the same time, the motor gateway of the dual slave motor 806*e*, 806*m* sends the raw position data to the second zone controller 804. At 1108, the first zone controller 802 determines the position of the moving element relative to the handoff position. At 1110, the second zone controller 804 separately determines the position of the moving element relative to the handoff position.

At 1112, the first zone controller 802 determines a coil current set point. Correspondingly, at 1114, the second zone controller 804 determines a coil current set point. In some cases, only one controller may determine the set point based on whether or not the position determination shows that the moving element is beyond a predetermined threshold such as, whether the moving element is on the first zone side of the handoff position or if the moving element is on the second zone side of the handoff position. At 1116 and 1118, both the first zone controllers 802 or the second zone controller 804 transmit their coil current set point. As noted, in some cases, only one zone controller may send depending on the predetermined threshold. At 1120, the coil current set point is then received by the motor gateway of the dual slave motor 806*e*, 806*m*.

As both zone controllers 802, 804 receive the same raw position data at approximately the same time, and because both zone controllers 802, 804 share substantially the same logic, there is intended to be coordination even when both zone controllers 802, 804 transmit the coil current set point. As noted, other techniques such as thresholds may also be used to limit which zone controller is sending the set point and/or which zone controller instructions the dual slave motor will follow in setting the current set point.

In some cases, the predetermined threshold, and specifically, the handoff position, may incorporate a hysteresis band. A hysteresis band is such that the handoff position when the moving element is moving in one direction is different than when the moving element is moving in another direction. This may prevent unnecessary switching over of control when the moving element is oscillating around a fixed handoff position.

In another case, the zone controllers 802, 804 may determine if they are to determine and transmit a coil current set point based on direction of travel of the moving element. For example, the zone controller 802, 804 that is located in the direction of travel of the moving element may determine and transmit the coil current set point.

In other embodiments, when the moving element is in the overlapping region, both zone controllers 802, 804 determine and transmit their coil current set points to the motor gateway of the dual slave motor 806e, 806m and the motor gateway selects the coil current set point based on an indicator, such as a flag in the set point data or based on a predetermined threshold. One example for the threshold is latency. For example, the motor gateway of the dual slave motor 806e, 806m selects the coil current set point that it received earliest from the zone controllers 802, 804.

At 1122, the motor gateway of the dual slave motor 806e, 806m transmits the coil current set point to the coil driver of the dual slave motor 806e, 806m to drive the specified current to the coils of the motor.

As noted, the selection of which zone controller's coil current set point to use may be determined by the zone controllers 802, 804. In this case, the zone controllers 802, 804 may have predetermined thresholds or may communicate with each other to determine the appropriate coil current set point to use and then transmit that coil current set point to the motor gateway.

Figure 12:
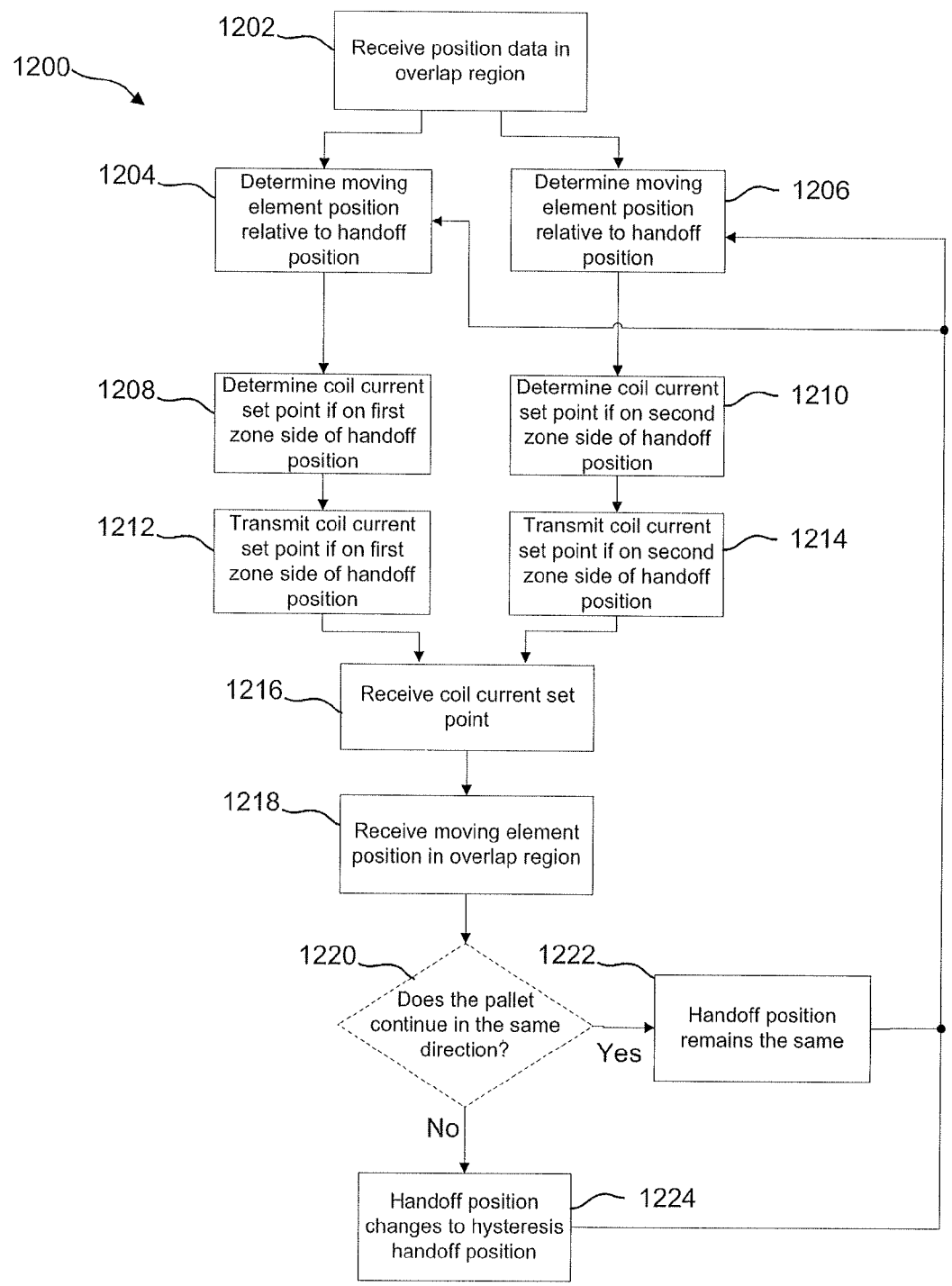
FIG. 12 is a flowchart for a method of controlling a moving element in an overlap region of a linear motor conveyor, according to another embodiment.

Turning to FIG. 12, a flowchart for another embodiment of a method 1200 of controlling a moving element in an overlap region of a linear motor conveyor is shown. At 1202, the zone controllers 802, 804, at substantially the same time, receive the raw position data of the moving element from a motor gateway of a dual slave motor 806e, 806m, located in the overlap region of two zones.

At 1204 and 1206, the first zone controller 802 and the second zone controller 804 determine the position of the moving element relative to the handoff position.

At 1208, the first zone controller 802 determines a coil current set point if the moving element is on the first zone side of the handoff position. Correspondingly, at 1210, the second zone controller 804 separately determines a coil current set point if the moving element is on the second zone side of the handoff position. At 1212 and 1214, the zone controllers 802 and 804 transmit their coil current set point (in some cases, both zone controllers may transmit, in others, a threshold may be used to determine which zone controller will send or which zone controller will be the primary or master for a particular case, other options will also be apparent to one of skill in the art on reading this disclosure). At 1216, the coil current set point is received by the motor gateway of the dual slave motor 806e, 806m. Having both zone controllers 802, 804 receive position data and send coil current set points reduces any risk of discontinuity in position feedback or coil current set points because both zone controllers are handling data on the same moving element in the same overlapping region.

At 1218, the zone controllers 802, 804, at substantially the same time, again receive the raw position data of the moving element from a motor gateway of a dual slave motor 806e, 806m, located in the overlap region of two zones.

At 1220, both the zone controllers 802, 804 separately determine whether the moving element continues travelling in the same direction. At 1222, if the moving element continues travelling in the same direction, the handoff position in the overlapping region remains the same.

At 1224, if the moving element changes direction, the handoff position may change to an alternate handoff position, referred to as the hysteresis handoff position. The hysteresis handoff position is a position within the dual slave motor 806e, 806m that is spaced a predetermined distance from the original handoff position in a direction that is the same as the new direction of travel of the moving element. The predetermined distance may be chosen based on the sensitivity desired before control is handed off to the other zone controller. Having handoff positions depending on direction reduces the chance of control flipping back and forth between the zone controllers if a pallet is oscillating about a single fixed handoff position.

The conveyor system 800 is configured to handle multiple moving elements in the overlap region at the same time because the sensors also track moving element identification so the zone controllers are able to track which position data belongs to which moving element.

Complexity in controls architecture for a linear motor conveyor may increase when instructions are handled across multiple devices. As software and communications usually have to be compatible across all devices, configuration and exception handling can become problematic; as well, there may be added time delays due to multiple levels of processing. An approach to address this complexity may be to avoid the handling of instructions and sharing of moving element control across multiple devices and levels in the control architecture. The motor gateways in the conveyor system 800 can collect and send raw position data from a position sensor to a zone controller 802, 804 without analyzing or altering the data. As well, the motor gateways can also send other raw data to the zone controller 802, 804 without analyzing or altering the data; such as thermistor readings for temperature monitoring.

Similarly, the motor gateways could set the coil currents from coil current set points received from the zone controller 802, 804 without knowledge about, for example, moving element position or the purpose of the particular coil current set point. In this way, the motor gateway does not have to be involved with moving element control logic or the processing of instructions. The zone controller 802, 804 receives the raw input data from the motor gateways, performs all data processing and control logic and sends raw coil current set points back to the motor gateways. Where the motors in the conveyor 800 have independently controlled coils that are interleaved, each coil can be controlled independently with an individual coil current set point from the zone controller. For example, each coil can have its own H-Bridge with its own pulse width modulation (PWM) signal for independent current control. In a further example, the motor may be a three phase motor in which windings are switched in a phased relationship.

Although the focus herein has been on motor gateways that merely transmit and receive data, there may be alternative embodiments where all or a subset of the motor gateways include some computational power to allow for the calculation of parameters involved in the control structure described herein. For example, in an application where a motor may need to be controlled in co-ordination with an external element, there may be advantages to having the motor exercise control independent of the zone controller for a predetermined amount of time or more generally.

In a further embodiment of the system, for simplification of control, the zone controllers 802, 804 may be configured to automatically detect motors on initialization of the conveyor system 800 and adapt to motors that have been added or removed. On initialization, the zone controller 802, 804 can bootstrap programmable logic devices, such as motor gateways, in the motors such that the motors do not have to store the executable logic or configuration information. This may further avoid the need for specific information and handling of instructions to be performed at multiple levels in the control architecture of the conveyor system 800. Substantially all of the configuration and processing is handled by the zone controllers 802, 804. If new motors are added, the new motors can be detected and configured by the zone controllers 802, 804. Then the new motors may start communicating raw data with the appropriate zone controller 802, 804. As well, software version mismatches may be avoided between the motors and the zone controllers 802, 804 as the zone controllers 802, 804 may load any programmable logic devices, such as motor gateways, on start up. Any software upgrades then require only a simple reload of the conveyor system 800.

In some embodiments, the linear motor conveyor 800 may have programmable stopping locations (not shown) for the moving elements on each motor. These stopping locations can be made with global scope so they can be placed anywhere on the conveyor system 800. For example, the stopping locations could be placed anywhere within a given zone such that moving elements may route through zones until they approach the determined stop location, at which point the moving element would stop. Moving elements route to global stopping locations while the conveyor system 800 keeps track of their respective data and move parameters; such as velocity, acceleration, tuning gains, fixture identification, and the like. When the conveyor system 800 is scaled up or down by adding or removing motors as described, the global stopping locations can remain and may not be affected.

Generally, embodiments of the disclosure are intended to provide at least some advantages over conventional systems and methods. The control architecture is intended to be adaptable such that it is suitable for small conveyor systems and suitable to scale up for large conveyor systems. The control architecture is also intended to not be constrained by processing power and network bandwidth, especially when it is desirable to scale up the conveyor system. The control system can support multiple zones, with each zone being able to have its own control. The zone boundaries in the control architecture may be configurable and adaptable. The control architecture is also intended to avoid discontinuities that can occur across zone or network boundaries when some control data is more recent than other control data. As discontinuities are avoided, the system may be able to operate more smoothly and accomplish tasks with less latency as the tasks may be completed in approximately real-time.

The control architecture is intended to avoid the complexity of sharing the handling of instructions and configuration across multiple devices by having control handled by the zone controllers and not the motor gateways or motors. In this way, system implementation, maintenance and scalability can be simplified when moving element control is not shared across multiple levels of the control architecture.

In one aspect, there is provided a method for handling handoff of a moving element in a linear motor conveyor, wherein the linear motor conveyor has more than one zone, the method including: receiving position of the moving element in an overlap region of a first zone and a second zone of the linear motor conveyor; transmitting the position to a first zone controller of the first zone and a second zone controller of the second zone; selecting coil current set point from the first zone controller or the second zone controller based on a predetermined threshold; determining coil current set point by the selected zone controller; receiving coil current set point from the selected zone controller; and transmitting coil current set point to a coil driver. In some cases, the predetermined threshold is a handoff position in the overlap region, the method further comprising comparing the position of the moving element relative to the handoff position. In other cases, the predetermined threshold comprises a hysteresis band such that the handoff position when the moving element is moving in one direction is different than when the moving element is moving in another direction. The first zone controller and the second zone controller may coordinate on the selection of coil current set point.

In another aspect, there is provided a linear motor conveyor which includes: a plurality of zones; a plurality of zone controllers, each zone controller assigned to one of the plurality of zones, the plurality of zones and zone controllers comprising: a first zone controller configured to control a first zone; a second zone controller configured to control a second zone, wherein a region of the second zone at least partially overlaps the first zone, and wherein the first zone controller and second zone controller coordinate to transmit coil current set points; a motor gateway associated with the overlapping region and configured to: transmit a position of the moving element to the first zone controller and the second zone controller, and receive coil current set points from the first zone controller or the second zone controller; and a coil driver configured to receive the coil current set point from the motor gateway and provide current to coils in the overlapping region.

In a further aspect, there is provided a method for determining position of a moving element in a linear motor conveyor, the method including: transmitting a request for data associated with position of the moving element to at least one motor gateway on a left network; transmitting a request for data associated with position of the moving element to at least one motor gateway on a right network; receiving the data associated with position of the moving element from the at least one motor gateway on the left network in a structured manner based on timing; receiving the data associated with position of the moving element from the at least one motor gateway on the right network in a structured manner based on timing; and determining a new instruction for driving the moving element. In some cases, the structured manner includes receiving the data associated with position of the moving element with the ordered timing of outermost data to innermost data. In other cases, the structured manner includes receiving the data associated with position of the moving element in the ordered timing of innermost data to outermost data, the outermost data being received after a predetermined latency period. In still other cases, the structured manner includes: constructing a package of data associated with position of the moving element in the order of outermost data to innermost data; and receiving the package of data associated with position of the moving element at approximately a single time.

In yet another aspect, there is provided a system for determining position of a moving element in a linear motor conveyor, the system including: at least one motor gateway associated with a left network of the linear motor conveyor; at least one motor gateway associated with a right network of the linear motor conveyor; a zone controller connected to the left network and the right network, and configured to receive a position of the moving element from the at least one motor gateway associated with the left network in a structured manner based on timing and the at least one motor gateway associated with a right network in a structured manner based on timing, and determine a new instruction for driving the moving element. In some cases, the structured manner includes receiving the data associated with position of the moving element with the ordered timing of outermost data to innermost data. In other cases, the structured manner comprises receiving the data associated with position of the moving element in the ordered timing of innermost data to outermost data, the outermost data being received after a predetermined latency period. In yet other cases, the structured manner includes: constructing a package of data associated with position of the moving element in the order of outermost data to innermost data; and receiving the package of data associated with position of the moving element at approximately a single time.

In yet another aspect, there is provided a method for controlling a moving element in a linear motor conveyor, the method including: transmitting a request for data associated with position of the moving element to a plurality of motor gateways on a network from a zone controller; receiving the data associated with position of the moving element at the zone controller from an innermost motor gateway on the network; transmitting an indicator from the innermost motor gateway on the network to a next innermost motor gateway on the network to notify the next innermost motor gateway to send data associated with position of the moving element to the zone controller; receiving the data associated with position of the moving element at the zone controller from the next innermost motor gateway on the network; determining a new instruction for driving the moving element at the zone controller; and transmitting the new instruction for driving the moving element to one of the motor gateways on the network from the zone controller. In some cases, the new instruction for driving the moving element is transmitted to the innermost motor on the network prior to receiving the data associated with position of the moving element from the next innermost motor gateway on the network.

In yet another aspect, there is provided a method for controlling a moving element in a zone of a linear motor conveyor, the method including: receiving raw sensor data at a motor gateway from a sensor; transmitting raw sensor data from a motor gateway to a zone controller; receiving the raw sensor data at the zone controller from the motor gateway; determining coil current set point by the zone controller based on the raw sensor data; transmitting coil current set point from the zone controller to the motor gateway; receiving coil current set point at the motor gateway from the zone controller; and transmitting coil current set point from the motor gateway to a coil driver.

In the preceding description, for purposes of explanation, numerous details are set forth in order to provide a thorough understanding of the embodiments. However, it will be apparent to one skilled in the art that these specific details may not be required. In other instances, well-known structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

We claim:

1. A system for controlling moving elements on a linear motor conveyor, the system comprising:
 a zone controller;
 a first network and a second network operatively connected to the zone controller;
 at least one first motor gateway associated with a portion of the conveyor and assigned to the first network; and
 at least one second motor gateway associated with a different portion of the conveyor and assigned to the second network;
 wherein the zone controller, the at least one first motor gateway, and the at least one second motor gateway are configured to:
 communicate data related to control of the moving elements via the first network and the second network in a structured manner to compensate for network or processing timing, wherein the structured manner comprises communicating the data in a timed sequence wherein each motor gateway communicates based on predetermined timing.

2. The system of claim 1, wherein each of the first network and the second network comprise:
 a command channel configured to communicate command data; and
 a response channel configured to communicate response data.

3. The system of claim 1, wherein the zone controller is further configured to:
 detect a new motor added to the linear motor conveyor; and
 configure the new motor and motor gateway associated with the new motor.

4. The system of claim 1, wherein the structured manner further comprises communicating the data in an event driven sequence based on an event indicator provided in communications.

5. The system of claim 4, wherein each motor gateway is configured to transmit the event indicator unless the motor gateway is the last motor gateway to complete the event.

6. The system of claim 1, wherein the linear motor conveyor comprises:
 a plurality of zone controllers, a plurality of first and second networks associated with the plurality of zone controllers and a plurality of at least one first and second motor gateways associated with the plurality of first and second networks.

7. The system of claim 6, wherein when a first adjacent motor gateway of the at least one motor gateway associated with a first zone controller is adjacent a second adjacent motor gateway of the at least one motor gateway associated with a second zone controller, each of the first and second adjacent motor gateways is configured to communicate data related to the moving elements to both the first zone controller and the second zone controller.

8. The system of claim 7, wherein control of the first adjacent motor gateway and second adjacent motor gateway is handled by either the first zone controller or the second zone controller based on a hysteresis band associated with a position and direction of movement of a moving element associated with the motor gateways.

9. A method for controlling moving elements on a linear motor conveyor, the method comprising:
communicating data related to control of the moving element conveyor between a zone controller and at least one first motor gateway associated with a portion of the conveyor, via a first network, wherein the data is communicated in a structured manner to compensate for network or processing timing;
communicating data related to control of the moving elements between the zone controller and at least one second motor gateway associated with a different portion of the conveyor, via a second network, wherein the data is communicated in the structured manner to compensate for network or processing timing, wherein the structured manner comprises communicating the data in a timed sequence wherein each motor gateway communicates based on predetermined timing.

10. The method of claim 9, further comprising:
communicating command data via a command channel of each of the first network and the second network; and
communicating response data via a response channel of each of the first network and the second network.

11. The method of claim 9, wherein the linear motor conveyor comprises:
a plurality of zone controllers, a plurality of first and second networks associated with the plurality of zone controllers and a plurality of at least one first and second motor gateways associated with the plurality of first and second networks.

12. The method of claim 9, further comprising:
detecting, via the zone controller, a new motor added to the linear motor conveyor; and
configuring the new motor and motor gateway associated with the new motor, via the zone controller.

13. The method of claim 9, wherein the structured manner further comprises communicating the data in an event driven sequence based on an event indicator provided in communications.

14. The method of claim 13, wherein each motor gateway is configured to transmit the event indicator unless the motor gateway is the last motor gateway to complete the event.

15. The method of claim 9, wherein when a first adjacent motor gateway of the at least one motor gateway associated with a first zone controller is adjacent a second adjacent motor gateway of the at least one motor gateway associated with a second zone controller, each of the first and second adjacent motor gateways is configured to communicate data related to the moving elements to both the first zone controller and the second zone controller.

16. The method of claim 15, wherein control of the first adjacent motor gateway and second adjacent motor gateway is handled by either the first zone controller or the second zone controller based on a hysteresis band associated with a position and direction of movement of a moving element associated with the motor gateways.

17. A system for controlling moving elements on a linear motor conveyor, the system comprising:
a zone controller;
a first network and a second network operatively connected to the zone controller;
at least one first motor gateway associated with a portion of the conveyor and assigned to the first network; and
at least one second motor gateway associated with a different portion of the conveyor and assigned to the second network;
wherein the zone controller, the at least one first motor gateway, and the at least one second motor gateway are configured to:
communicate data related to control of the moving elements via the first network and the second network in a structured manner to compensate for network or processing timing and wherein the structured manner comprises communicating the data in a latching sequence wherein each motor gateway receives a command and creates a snapshot of the data relating to the moving elements at a predetermined time and communicates the snapshot to the zone controller such that the zone controller performs calculations on substantially simultaneous data.

18. A method for controlling moving elements on a linear motor conveyor, the method comprising:
communicating data related to control of the moving element conveyor between a zone controller and at least one first motor gateway associated with a portion of the conveyor, via a first network, wherein the data is communicated in a structured manner to compensate for network or processing timing;
communicating data related to control of the moving elements between the zone controller and at least one second motor gateway associated with a different portion of the conveyor, via a second network, wherein the data is communicated in a structured manner to compensate for network or processing timing and wherein the structured manner comprises communicating the data in a latching sequence wherein each motor gateway receives a command and creates a snapshot of the data relating to the moving elements at a predetermined time and communicates the snapshot to the zone controller such that the zone controller performs calculations on substantially simultaneous data.

* * * * *